(12) United States Patent
Miao et al.

(10) Patent No.: US 10,701,725 B2
(45) Date of Patent: Jun. 30, 2020

(54) SCHEDULING RESOURCE CONFIGURATION METHOD AND APPARATUS, USER EQUIPMENT, AND BASE STATION

(71) Applicant: HUAWEI TECHNOLOGIES CO., LTD., Shenzhen, Guangdong (CN)

(72) Inventors: Jinhua Miao, Shenzhen (CN); Jian Zhang, Beijing (CN); Wei Quan, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/008,535

(22) Filed: Jun. 14, 2018

(65) Prior Publication Data
US 2018/0295642 A1 Oct. 11, 2018

Related U.S. Application Data

(63) Continuation of application No. PCT/CN2015/097412, filed on Dec. 15, 2015.

(51) Int. Cl.
*H04W 72/12* (2009.01)
*H04W 72/02* (2009.01)

(52) U.S. Cl.
CPC ....... *H04W 72/1289* (2013.01); *H04W 72/02* (2013.01); *H04W 72/12* (2013.01); *H04W 72/1231* (2013.01); *H04W 72/1236* (2013.01)

(58) Field of Classification Search
None
See application file for complete search history.

(56) References Cited

U.S. PATENT DOCUMENTS

2011/0063975 A1* 3/2011 Ohseki ............ H04W 72/1257
370/230.1
2013/0250876 A1* 9/2013 Hugl ................... H04W 24/10
370/329
(Continued)

FOREIGN PATENT DOCUMENTS

CN 101902728 A 12/2010
CN 102111892 A 6/2011
(Continued)

OTHER PUBLICATIONS

3GPP TSG RAN WG1 Meeting #58 R1-093422,"ITU SPS VoIP Pertormance",Motorola, Aug. 24-28, 2009,total 8 pages.
(Continued)

*Primary Examiner* — Faruk Hamza
*Assistant Examiner* — Cassandra L Decker
(74) *Attorney, Agent, or Firm* — Womble Bond Dickinson (US) LLP

(57) ABSTRACT

The disclosure discloses a scheduling resource configuration method and apparatus, user equipment, and a base station, so as to obtain, from a location such as a core network or a user terminal, related data, of a service that is currently executed by the user terminal, and further generate and configure scheduling configuration information such as SPS scheduling configuration information based on the data. The base station and the user terminal both run, based on the generated scheduling configuration information, the service that is currently executed by the user equipment. This disclose dynamic configuration of a scheduling resource such as an SPS resource, effectively saves resources, such as PDCCH resources, used for a scheduling indication in a system, and can also ensure, to fullest extent, data transmission quality of some services whose data packet sizes, periods, or the like change.

20 Claims, 12 Drawing Sheets

(56) References Cited

U.S. PATENT DOCUMENTS

| | | |
|---|---|---|
| 2013/0286982 A1 | 10/2013 | Chen et al. |
| 2014/0349695 A1 | 11/2014 | Zetterberg et al. |
| 2015/0078231 A1 | 3/2015 | Bergström et al. |
| 2016/0135236 A1* | 5/2016 | Zhu .......................... H04B 7/26 370/230 |
| 2017/0071010 A1* | 3/2017 | Lim .................. H04W 72/1284 |
| 2017/0099675 A1* | 4/2017 | Gineste ............. H04W 72/1263 |

FOREIGN PATENT DOCUMENTS

| | | |
|---|---|---|
| CN | 102547610 A | 7/2012 |
| CN | 103067864 A | 4/2013 |
| CN | 103490864 A | 1/2014 |
| CN | 103857050 A | 6/2014 |
| CN | 103857051 A | 6/2014 |
| WO | 2013079114 A1 | 6/2013 |

OTHER PUBLICATIONS

3GPP TS 36.331 V12.7.0 (Sep. 2015);3rd Generation Partnership Project;Technical Specification Group Radio Access Network;Evolved Universal Terrestrial Radio Access (E-UTRA);Radio Resource Control (RRC);Protocol specification (Release 12),total 453 pages.
3GPP TS 36321 V12.7.0 (Sep. 2015);3rd Generation Partnership Project;Technical Specification Group Radio Access Network;Evolved Universal Terrestrial Radio Access (E-UTRA);Medium Access Control (MAC) protocol specification (Release 12),total 77 pages.

* cited by examiner

SCHEDULING RESOURCE CONFIGURATION METHOD AND APPARATUS, USER EQUIPMENT, AND BASE STATION

CROSS-REFERENCE TO RELATED APPLICATIONS

This application is a continuation of International Application No. PCT/CN2015/097412, filed on Dec. 15, 2015, the disclosure of which is hereby incorporated by reference in its entirety.

TECHNICAL FIELD

The disclosure relates to the field of communications technologies, and in particular, to a scheduling resource configuration method and apparatus, user equipment, and a base station.

BACKGROUND

Semi-persistent scheduling (SPS) is also referred to as semi-static scheduling. Current dynamic scheduling means: Each time user equipment (UE) is to receive or send data, a base station is required to send a scheduling resource. In SPS, semi-static configuration of a radio resource is allowed, and the resource is periodically allocated to specific UE. Correspondingly, the UE periodically transmits service data based on the configured radio resource.

A Long Term Evolution (LTE) system is used as an example. An eNodeB (eNB, base station) specifies, in a transmission time interval (TTI) by using a physical downlink control channel (PDCCH) scrambled by an SPS cell radio network temporary identifier (C-RNTI), a radio resource used by UE. After each period, the UE receives or sends data by using the resource. The eNB does not need to deliver a PDCCH in the subframe (referred to as an SPS subframe) to specify the allocated resource. Because SPS has a characteristic of "an allocated resource can be used for a plurality of times", PDCCH resources used for a scheduling indication in the system can be effectively saved.

However, in all existing configuration manners, SPS configuration is directly performed on a network side for UE. When there is a relatively large change in a data packet of a service, of the UE, executed by using a configured SPS resource, for example, there is a relatively large change in a data packet size or a data packet interval, data transmission of the service cannot be well implemented by using the configured SPS resource. In addition, an SPS resource configured in an existing configuration manner cannot satisfy an SPS requirement of a service whose data packet size or packet interval changes.

SUMMARY

To resolve a technical problem, the disclosure provides a scheduling resource configuration method and apparatus, user equipment, and a base station, so as to implement dynamic configuration of a scheduling resource such as an SPS resource.

According to a first aspect, a scheduling resource configuration method is provided, including:

generating scheduling configuration indication information for user equipment, where the scheduling configuration indication information includes scheduling configuration information, and the scheduling configuration indication information is used to instruct the user equipment to select, from the scheduling configuration information included in the scheduling configuration indication information, scheduling configuration information for a target service of the user equipment; and sending the scheduling configuration indication information to the user equipment, so that the user equipment selects the scheduling configuration information to transmit data of the target service.

With reference to the first aspect, in a first possible implementation, the scheduling configuration indication information includes a plurality of pieces of scheduling configuration information, and a threshold interval is preset for each piece of scheduling configuration information; and the scheduling configuration indication information is specifically used to instruct the user equipment to select, based on a threshold interval to which a data packet feature value of the target service belongs, the scheduling configuration information for the target service of the user equipment from the plurality of pieces of scheduling configuration information included in the scheduling configuration indication information, and the data packet feature value of the target service includes a data packet size value and/or a data packet interval value.

With reference to the first aspect, in a second possible implementation, the scheduling configuration indication information includes an index table, and the index table includes a plurality of scheduling configuration information identifiers, and resource values that are in a one-to-one correspondence to the scheduling configuration information identifiers; and the scheduling configuration indication information is specifically used to instruct the user equipment to select, based on a data packet feature value of the target service and the index table, the scheduling configuration information for the target service of the user equipment from a plurality of pieces of scheduling configuration information included in the scheduling configuration indication information, and the data packet feature value of the target service includes a data packet size value and/or a data packet interval value.

With reference to the first aspect, the first possible implementation of the first aspect, or the second possible implementation of the first aspect, in a third possible implementation, the method further includes:

receiving a scheduling configuration identifier sent by the user equipment, where the scheduling configuration identifier is used to mark the scheduling configuration information that is selected by the user equipment based on an instruction of the scheduling configuration indication information; and detecting a current network environment, and if a detection result is that the current network environment is suitable for executing the target service by using the scheduling configuration information marked by using the scheduling configuration identifier, sending a notification message to instruct the user equipment to execute the target service based on the selected scheduling configuration information.

With reference to the first aspect, the first possible implementation of the first aspect, or the second possible implementation of the first aspect, in a fourth possible implementation, the method further includes:

receiving a scheduling configuration identifier sent by the user equipment, where the scheduling configuration identifier is used to mark the scheduling configuration information that is selected by the user equipment based on an instruction of the scheduling configuration indication information;

detecting a current network environment, and if a detection result is that the current network environment is not suitable for executing the target service by using the scheduling configuration information marked by using the scheduling configuration identifier, modifying the scheduling configuration information marked by using the scheduling configuration identifier; and sending modified scheduling configuration information to the user equipment, so that the user equipment executes the target service based on the modified scheduling configuration information.

According to a second aspect, a scheduling resource configuration method is provided, including:

receiving scheduling configuration indication information sent by a base station;

selecting, from scheduling configuration information included in the scheduling configuration indication information, scheduling configuration information for a target service of user equipment; and transmitting data of the target service based on the selected scheduling configuration information.

With reference to the second aspect, in a first possible implementation, the selecting, from scheduling configuration information included in the scheduling configuration indication information, scheduling configuration information for a target service of user equipment includes:

detecting a data packet feature value of a data packet transmitted during execution of the target service, where the data packet feature value includes a data packet size value and/or a data packet interval value; and selecting, based on a threshold interval to which the data packet feature value of the target service belongs, the scheduling configuration information for the target service of the user equipment from a plurality of pieces of scheduling configuration information included in the scheduling configuration indication information.

With reference to the second aspect, in a second possible implementation, the selecting, from scheduling configuration information included in the scheduling configuration indication information, scheduling configuration information for a target service of user equipment includes:

detecting a data packet feature value of a data packet transmitted during execution of the target service, where the data packet feature value includes a data packet size value and/or a data packet interval value; and selecting, based on a data packet feature value of the target service and an index table included in the scheduling configuration indication information, the scheduling configuration information for the target service of the user equipment from a plurality of pieces of scheduling configuration information included in the scheduling configuration indication information, where the index table includes a plurality of scheduling configuration information identifiers, and resource values that are in a one-to-one correspondence to the scheduling configuration information identifiers.

With reference to the second aspect, the first possible implementation of the second aspect, or the second possible implementation of the second aspect, in a third possible implementation, the method further includes:

sending, to the base station, a scheduling configuration identifier that is used to mark the selected scheduling configuration information; and if a confirmation message returned by the base station is received, executing the target service based on the selected scheduling configuration information.

With reference to the second aspect, the first possible implementation of the second aspect, or the second possible implementation of the second aspect, in a fourth possible implementation, the method further includes:

sending, to the base station, a scheduling configuration identifier that is used to mark the selected scheduling configuration information; and if modified scheduling configuration information returned by the base station is received, executing the target service based on the modified scheduling configuration information.

According to a third aspect, a scheduling resource configuration method is provided, including:

obtaining service information of a currently executed target service, and determining a service feature of the target service, where the service information includes a bearer type and/or a QoS class identifier QCI of the target service or includes a data format of historically transmitted data of the target service;

generating one or more pieces of configuration requirement information based on the determined service feature; and sending the one or more pieces of generated configuration requirement information to a base station, so that the base station generates, based on the one or more pieces of configuration requirement information, scheduling configuration information for the target service of user equipment.

According to a fourth aspect, a scheduling resource configuration method is further provided, including:

generating, based on a service feature of each target service currently executed by user equipment, scheduling configuration information for each target service of the user equipment; and sending the scheduling configuration information to the user equipment, so that the user equipment transmits data of a corresponding target service based on the scheduling configuration information, where a manner of obtaining the service feature of each target service executed by the user equipment includes: determining the service feature based on service information, reported by the user equipment, of each target service; or determining the service feature based on service information, obtained from a core network, of each target service of the user equipment.

With reference to the fourth aspect, in a first possible implementation, the service feature is determined based on the service information of the target service, where the service information includes a bearer type and/or a QoS class identifier QCI of one or more target services, or the service information includes a historical data format of a transmitted data packet of one or more target services; and the service feature includes data packet size feature information and/or data packet interval feature information.

According to a fifth aspect, a scheduling resource configuration method is provided, including:

obtaining service information of each currently executed target service, where the service information includes a bearer type and/or a QoS class identifier QCI of the target service, or the service information includes a historical data format of a transmitted data packet of the target service;

reporting the obtained service information to a base station; and receiving scheduling configuration information that is generated, based on the service information, by the base station for a corresponding target service, and transmitting data of the corresponding target service based on the received scheduling configuration information.

According to a sixth aspect, a scheduling resource configuration method is provided, including:

generating semi-persistent scheduling configuration information for a target service;

transmitting data of the target service based on an indication in transmission indication information in the semi-persistent scheduling configuration information; and sending the generated semi-persistent scheduling configuration information to user equipment, so that the user equipment transmits data of the target service based on an indication in the semi-persistent scheduling configuration information, where the transmission indication information includes any one or more of a duration indication, a TTI length indication of a physical-layer resource, a coding format indication, and a carrier identifier indication.

According to a seventh aspect, a scheduling resource configuration apparatus is provided, and the apparatus includes modules configured to perform corresponding steps in the foregoing method according to the first aspect.

According to an eighth aspect, a scheduling resource configuration apparatus is provided, and the apparatus includes modules configured to perform corresponding steps in the foregoing method according to the second aspect.

According to a ninth aspect, a scheduling resource configuration apparatus is provided, and the apparatus includes modules configured to perform corresponding steps in the foregoing method according to the third aspect.

According to a tenth aspect, a scheduling resource configuration apparatus is provided, and the apparatus includes modules configured to perform corresponding steps in the foregoing method according to the fourth aspect.

According to an eleventh aspect, a scheduling resource configuration apparatus is provided, and the apparatus includes modules configured to perform corresponding steps in the foregoing method according to the fifth aspect.

According to a twelfth aspect, a scheduling resource configuration apparatus is provided, and the apparatus includes modules configured to perform corresponding steps in the foregoing method according to the sixth aspect.

According to a thirteenth aspect, a base station is provided, including a transceiver apparatus and a processor connected to the transceiver apparatus, where the transceiver apparatus is configured to communicate with user equipment and a network device, and the processor is configured to perform the foregoing method according to the first aspect.

According to a fourteenth aspect, user equipment is provided, including a communications interface and a processor connected to the communications interface, where the communications interface is configured to communicate with a base station, and the processor is configured to perform the foregoing method according to the second aspect.

According to a fifteenth aspect, user equipment is provided, including a receiver, a transmitter, and a processor connected to the receiver and the transmitter, where the receiver and the transmitter are configured to communicate with a base station, and the processor is configured to perform the foregoing method according to the third aspect.

According to a sixteenth aspect, a base station is provided, including a network interface and a processor connected to the network interface, where the network interface is configured to communicate with user equipment and a network device, and the processor is configured to perform the foregoing method according to the fourth aspect.

According to a seventeenth aspect, user equipment is provided, including a communications interface and a processor connected to the communications interface, where the communications interface is configured to communicate with a base station, and the processor is configured to perform the foregoing method according to the fifth aspect.

According to an eighteenth aspect, a base station is further provided, including a transceiver apparatus and a processor connected to the transceiver apparatus, where the transceiver apparatus is configured to communicate with user equipment and a network device, and the processor is configured to perform the foregoing method according to the sixth aspect.

According to a nineteenth aspect, a computer storage medium is provided, where the computer storage medium stores program code, and the program code is used to instruct to perform the foregoing method according to the first aspect.

According to a twentieth aspect, a computer storage medium is provided, where the computer storage medium stores program code, and the program code is used to instruct to perform the foregoing method according to the second aspect.

According to a twenty-first aspect, a computer storage medium is provided, where the computer storage medium stores program code, and the program code is used to instruct to perform the foregoing method according to the third aspect.

According to a twenty-second aspect, a computer storage medium is provided, where the computer storage medium stores program code, and the program code is used to instruct to perform the foregoing method according to the fourth aspect.

According to a twenty-third aspect, a computer storage medium is provided, where the computer storage medium stores program code, and the program code is used to instruct to perform the foregoing method according to the fifth aspect.

According to a twenty-fourth aspect, a computer storage medium is provided, where the computer storage medium stores program code, and the program code is used to instruct to perform the foregoing method according to the sixth aspect.

In the disclosure, the scheduling configuration information for the user equipment can be configured or reconfigured based on a specific data packet feature of the target service executed by the user equipment or the data format of the historically transmitted data generated during execution of the target service. This implements dynamic configuration of a scheduling resource such as an SPS resource, effectively saves resources, such as PDCCH resources, used for a scheduling indication in a system, and can also ensure, to fullest extent, data transmission quality of some services whose data packet sizes, periods, or the like change.

BRIEF DESCRIPTION OF DRAWINGS

To describe the technical solutions in the embodiments of the disclosure more clearly, the following briefly describes the accompanying drawings required for describing the embodiments. Apparently, the accompanying drawings in the following description show merely some embodiments of the disclosure, and a person of ordinary skill in the art may still derive other drawings from these accompanying drawings without creative efforts.

DESCRIPTION OF EMBODIMENTS

The following clearly describes the technical solutions in the embodiments of the disclosure with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the disclosure.

The term "include" and any other variant of the term in the specification, claims, and accompanying drawings of the disclosure are intended to cover non-exclusive inclusion. For example, a process, method, system, product, or device that includes a series of steps or units is not limited to the listed steps or units, but optionally further includes a step or unit that is not listed, or optionally further includes another step or unit that is inherent to the process, method, product, or device.

Figure 1:
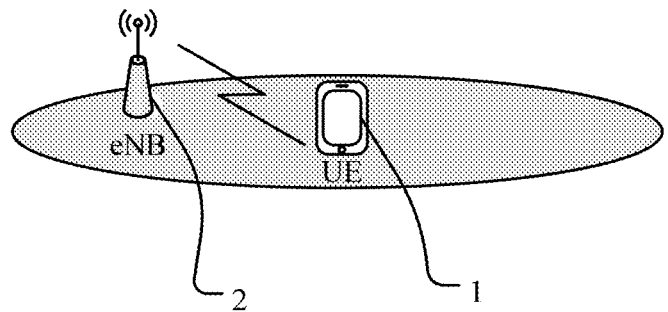
FIG. 1 is a schematic structural diagram of a scheduling resource configuration system according to an embodiment of the disclosure.

A scheduling resource configuration method in the embodiments of the disclosure may be applied to a communications system such as an LTE communications system/a UMTS communications system. A specific system architecture diagram is shown in FIG. 1. FIG. 1 is a schematic structural diagram of a scheduling resource configuration system according to an embodiment of the disclosure. User equipment UE1 and a base station 2 (for example, an eNB) communicate with each other, and a base station side completes scheduling-resource configuration for the user equipment UE1 based on related information of a target service executed by the UE1. The configuration may specifically include SPS resource configuration for the user equipment UE1.

Figure 2:
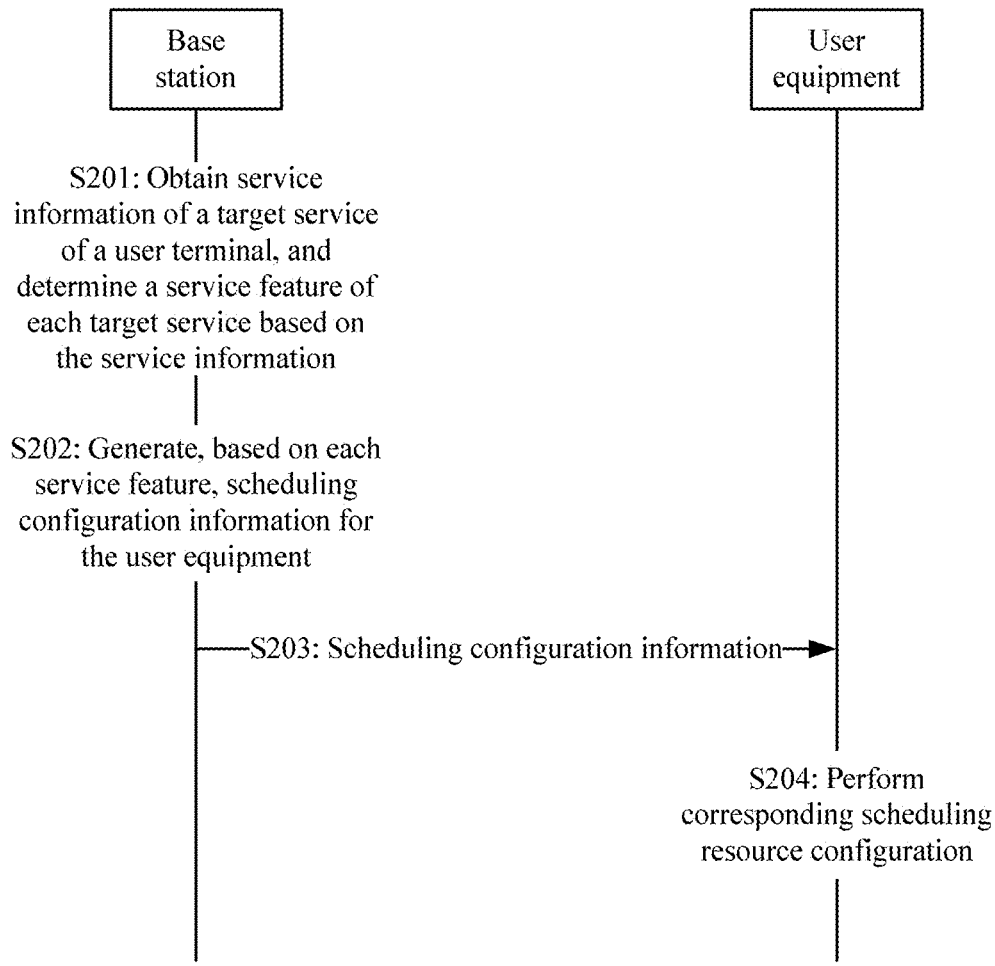
FIG. 2 is a schematic flowchart of a scheduling resource configuration method according to an embodiment of the disclosure.

In the system shown in FIG. 1, for a service executed by the UE1, the base station 2 may configure a scheduling resource of the UE1 based on related information of the service. FIG. 2 is a schematic flowchart of a scheduling resource configuration method according to an embodiment of the disclosure. The scheduling resource configuration method includes the following steps.

S201: A base station obtains service information of a target service of a user terminal, and determines a service feature of each target service based on the service information.

The target service executed by the user terminal may include one or more services. The target service may be all services currently executed by the user terminal, or may be a service selected from all currently executed services. For example, the target service is selected based on a preconfigured target service identifier, or the target service is selected based on whether a service type is suitable for SPS scheduling.

Service information of each target service includes service information, of the target service, obtained by the base station from a core network, or service information, of the target service, reported by the user terminal. The service information includes a bearer type, a QCI (QoS class identifier), and the like. The base station may predict packet distribution information of a corresponding target service based on information such as a bearer type and a QCI, to obtain a service feature, such as a specific data packet size or packet interval information. The base station may further perform S202 based on the service feature. A specific service feature includes data packet size feature information and/or data packet interval feature information.

When service information of some target services is not easy to determine, and a service feature cannot be directly obtained, the service information may be a historical data format of data transmitted during execution of the services, for example, a size or a packet interval of each historically transmitted data packet. A historical data format of each target service may also be obtained from the core network or be reported by the user equipment. The base station may learn the historical data format to predict a service feature of each current service.

Certainly, alternatively, the user equipment may learn the historical data format of data transmitted during execution of each current target service, directly predict a service feature of each current service, and report the service feature to the base station.

S202: The base station generates, based on each service feature, scheduling configuration information for the user equipment.

The scheduling configuration information may be SPS resource information, specifically including an SPS period, a packet size, duration, a TTI length of a corresponding physical-layer resource, a coding format, SPS duration (for example, a specific quantity of contiguous TTIs), a corresponding carrier ID, and the like.

The base station may generate scheduling configuration information for each target service currently executed by the user equipment, and configure a plurality of types of SPS resources for the user equipment, so as to serve each target service of the user equipment based on different resource sizes, time intervals, and the like.

S203: The base station sends the generated scheduling configuration information to the user terminal.

The base station sends the generated scheduling configuration information, such as SPS configuration information, to the user terminal by using an established communications link, and performs scheduling of a corresponding radio resource based on the scheduling configuration information.

S204: The user terminal performs corresponding scheduling resource configuration based on an indication in the received scheduling configuration information, to transmit data of a corresponding target service.

The user terminal performs configuration based on the scheduling configuration information, to transmit the data of the target service based on the indication in the scheduling configuration information. Specifically, for example, the data is transmitted based on a data packet size, a period, a carrier ID, or the like in the scheduling configuration information.

An LTE system is used as an example. A base station 2 is an eNB, and the eNB may obtain, from a core network, service information of each target service of UE1. After a connection is established between the UE1 and the core network, the core network obtains service information, including a bearer type, a QCI, and the like, of the UE1.

After a connection is established between the UE1 and the eNB, the eNB obtains the bearer type, the QCI, and the other information from the core network, and further predicts a service feature of the UE1. Then, the eNB generates SPS configuration information based on the predicted service feature, and sends the SPS configuration information to the UE1. The predicted service feature of the UE1 may be packet distribution information and the like, that is, a data packet size, packet interval information, and the like of each service executed by the UE1.

Optionally, the eNB may alternatively obtain the service information from the UE1. After the connection is established between the UE1 and the core network, alternatively, the UE1 may obtain service information corresponding to each target service, and send information about the service information to the eNB, so that the eNB predicts a service feature to perform SPS configuration.

Optionally, the eNB may alternatively learn a service feature of the service executed by the UE1. After the connection is established between the UE1 and the eNB, the eNB may perform inference learning based on a historical data format used in data transmission performed by the UE1 for each target service, and further predict a service feature of a later service of the UE1, so as to allocate or reallocate an SPS resource to the UE1.

Optionally, the eNB may alternatively receive a service format, of each target service, reported by the UE1. After transmitting the service, the UE1 may perform inference learning based on a historical data format of the transmitted service, and further predict a subsequent service format. Then, the UE1 sends information about the service format to the eNB, so that the eNB allocates or reallocates SPS configuration information to the UE1.

Specific SPS resource information may include an SPS period, a packet size, duration, a TTI length of a corresponding physical-layer resource, a coding format, SPS duration (for example, a specific quantity of contiguous TTIs), a corresponding carrier ID, and the like.

After completing resource scheduling, the eNB generates the SPS configuration information, and sends the SPS configuration information to the UE1. After receiving the corresponding SPS configuration information, the UE1 performs corresponding SPS configuration based on an indication in the SPS configuration information.

It should be noted that, in this embodiment of the disclosure, scheduling configuration information is generated mainly for one or more services with a relatively small change in a data packet size or a packet interval; when it is determined, based on the service feature obtained in S201, that there is a relatively large change in a data packet size or interval of a service, scheduling configuration information is not generated for the service. In addition, after generating scheduling configuration information, when a corresponding service is closed, the base station stops SPS resource scheduling for the closed service.

Figure 3:
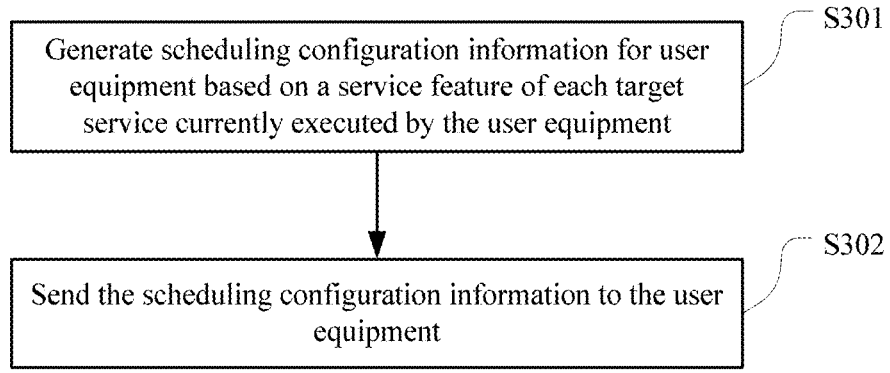
FIG. 3 is a schematic flowchart of a first embodiment of a scheduling resource configuration method on a base station side according to the disclosure.

Referring to FIG. 3, FIG. 3 is a schematic flowchart of a first embodiment of a scheduling resource configuration method on a base station side according to the disclosure. The method in this embodiment of the disclosure is performed on the base station side, and the method includes the following steps.

S301: Generate scheduling configuration information for user equipment based on a service feature of each target service currently executed by the user equipment.

A manner of obtaining the service feature of each target service executed by the user equipment includes: determining the service feature based on service information, reported by the user equipment, of each target service; or determining the service feature based on service information, obtained from a core network, of each target service of the user equipment. In S301, corresponding scheduling configuration information may be generated for each running service.

S302: Send the scheduling configuration information to the user equipment, so that the user equipment correspondingly transmits data of a corresponding target service based on the scheduling configuration information.

After completing configuration based on the scheduling configuration information, the user equipment may transmit the data of the target service based on a period, a packet size, duration, a TTI length of a corresponding physical-layer resource, a coding format, SPS duration (for example, a specific quantity of contiguous TTIs), a corresponding carrier ID, and the like in the scheduling configuration information.

In this embodiment of the disclosure, the base station side can configure or reconfigure the scheduling configuration information for the user equipment based on the feature of the target service executed by the user equipment. This implements dynamic configuration of a scheduling resource such as an SPS resource, effectively saves resources, such as PDCCH resources, used for a scheduling indication in a system, and can also ensure, to fullest extent, data transmission quality of some services whose data packet sizes, periods, or the like change.

Figure 4:
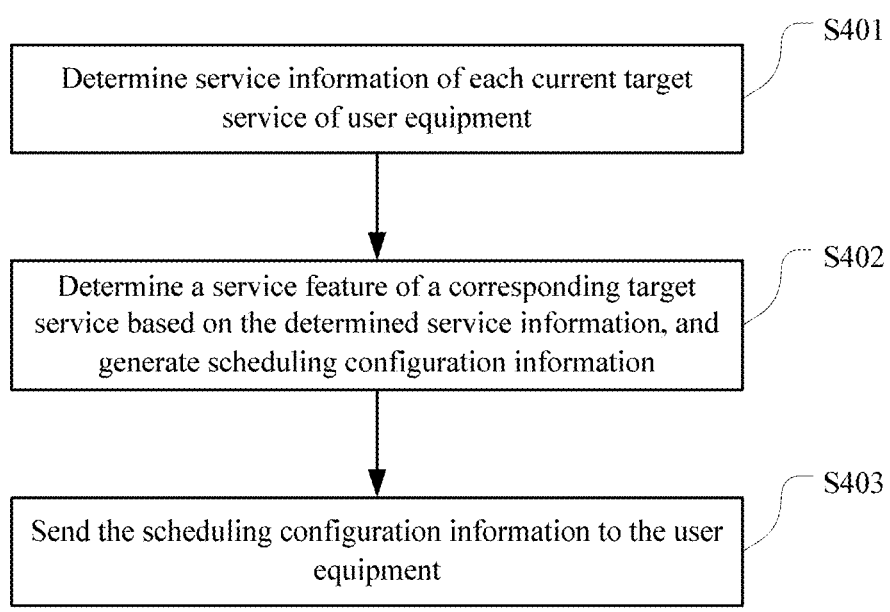
FIG. 4 is a schematic flowchart of a second embodiment of a scheduling resource configuration method on a base station side according to the disclosure.

Referring to FIG. 4, FIG. 4 is a schematic flowchart of a second embodiment of a scheduling resource configuration method on a base station side according to the disclosure. The method in this embodiment of the disclosure is performed on the base station side, and the method includes the following steps.

S401: Determine service information of each current target service of user equipment.

In this embodiment of the disclosure, the service information is mainly a bearer type, a QCI, and other information corresponding to each target service. A step of obtaining the service information may include: determining the service information of the target service of the user equipment from service data, of the target service, generated by a core network server that bears the target service of the user equipment; or receiving the service information, of the target service of the user equipment, generated and reported by the user equipment during execution of the target service.

S402: Determine a service feature of a corresponding target service based on the determined service information, and generate scheduling configuration information, where the service feature includes data packet size feature information and/or data packet interval feature information.

The generated scheduling configuration information is SPS resource configuration information, including information such as SPS period information, data packet size information, SPS duration information, TTI length information of a physical-layer resource, coding format information, and carrier identifier information. In S402, corresponding scheduling configuration information may be generated for each running service.

S403: Send the scheduling configuration information to the user equipment, so that the user equipment correspondingly runs each target service and transmits data of a corresponding service based on the scheduling configuration information.

In this embodiment of the disclosure, a process of determining the service information may be performed after the target service has been executed for a period of time. In an initial phase of execution of the target service, semi-persistent resource scheduling may not be performed, or semi-persistent resource scheduling may be performed based on only a service type of the target service. In an execution process of the target service, the service information of the target service is obtained, the service feature is further obtained through analysis, and the scheduling configuration information is generated based on the service feature.

Reconfiguration is performed for the user terminal based on the generated scheduling configuration information. For example, during SPS resource allocation in a start stage, a scheduling period may be 20 ms, and an allocated-resource can be used to transmit 40 bytes. However, if it is found, through analysis based on the service information, that a data packet size increases or that there is another data format, for example, a data format that satisfies a requirement that an average size is 100 bytes and an average interval is approximately 10 ms, during SPS resource reallocation, the following may be configured: A resource whose scheduling period is 10 ms and whose scheduling resource size is 100 bytes coexists with a resource that can be used to transmit 40 bytes and whose period is 20 ms.

In this embodiment of the disclosure, SPS resource configuration of the user terminal can be accurately set or adjusted by using the service information, of the target service of the user terminal, obtained from the core network or the user terminal. This implements dynamic configuration of a scheduling resource such as an SPS resource, effectively saves PDCCH resources used for a scheduling indication in a system, and can also ensure, to fullest extent, data transmission quality of some services whose data packet sizes, periods, or the like change.

Figure 5:
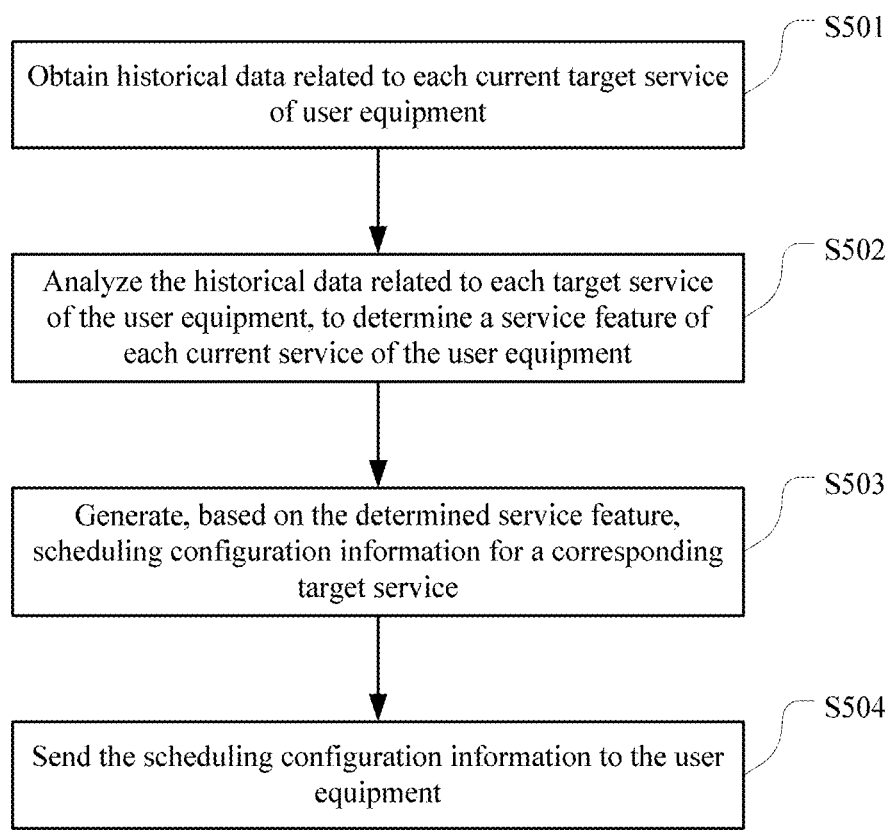
FIG. 5 is a schematic flowchart of a third embodiment of a scheduling resource configuration method on a base station side according to the disclosure.

Referring to FIG. 5, FIG. 5 is a schematic flowchart of a third embodiment of a scheduling resource configuration method on a base station side according to the disclosure. The method in this embodiment of the disclosure is performed on the base station side, and the method includes the following steps.

S501: Obtain historical data related to each current target service of user equipment.

The historical data mainly includes a packet distribution status, including data such as data packet size distribution and a packet interval, of a data packet that is transmitted by the user equipment during execution of the target service and by using a network. The historical data may be obtained by a base station from a core network or may be obtained from the user equipment. It should be noted that a name of the historical data is merely used for a purpose of identification, but does not constitute any limitation on related data in this embodiment of the disclosure.

S502: Analyze the historical data related to each target service of the user equipment, to determine a service feature of each current service of the user equipment.

A historical data format can be roughly determined based on data, such as packet sizes of a plurality of data packets or a packet interval between data packets, described in the historical data, and further, the service feature of each current service is determined. The determined historical data format may include information such as a maximum value of the data packet sizes or a maximum value of data packet intervals, or may be an average value of the data packet sizes, an average value of the data packet intervals, or the like.

S503: Generate, based on the determined service feature, scheduling configuration information for a corresponding target service.

The service feature includes data packet size feature information and/or data packet interval feature information, or the like. The generated scheduling configuration information is SPS resource configuration information, including information such as SPS period information, data packet size information, SPS duration information, TTI length information of a physical-layer resource, coding format information, and carrier identifier information. In S503, corresponding scheduling configuration information may be generated for each running service.

S504: Send the scheduling configuration information to the user equipment, so that the user equipment correspondingly runs each target service and transmits data of a corresponding service based on the scheduling configuration information.

In this embodiment of the disclosure, a process of determining the service information may be performed after the target service has been executed for a period of time. In an initial phase of execution of the target service, semi-persistent resource scheduling may not be performed, or semi-persistent resource scheduling may be performed based on only a service type of the target service. In an execution process of the target service, the historical data of the target service is obtained, the service feature is further obtained through analysis, and the scheduling configuration information is generated based on the service feature.

Reconfiguration is performed for the user terminal based on the generated scheduling configuration information. For example, during SPS scheduling allocation in a start stage, a scheduling period may be 20 ms, and an allocated-resource can be used to transmit 40 bytes. However, if it is found, through analysis based on the service information, that a data packet size increases or that there is another data format, for example, a data format that satisfies a requirement that an average size is 80 bytes and an average interval is approximately 20 ms, and a used TTI length is 0.5 ms, during SPS resource reallocation, the following may be configured: A resource whose scheduling period is 20 ms and whose scheduling resource size is 80 bytes coexists with a resource that can be used to transmit 40 bytes and whose period is 20 ms, or there is only a configuration manner that can be used to transmit 120 bytes, a period is 20 ms, and a TTI length is 0.5 ms.

In this embodiment of the disclosure, the service feature of the service executed by the user equipment can be relatively accurately obtained by obtaining the historical data of the target service of the user equipment from the core network or the user equipment and analyzing the historical data, so that SPS resource configuration of the user terminal is accurately set or adjusted. This implements dynamic configuration of a scheduling resource such as an SPS resource, effectively saves PDCCH resources used for a scheduling indication in a system, and can also ensure, to fullest extent, data transmission quality of some services whose data packet sizes, periods, or the like change.

Figure 6:
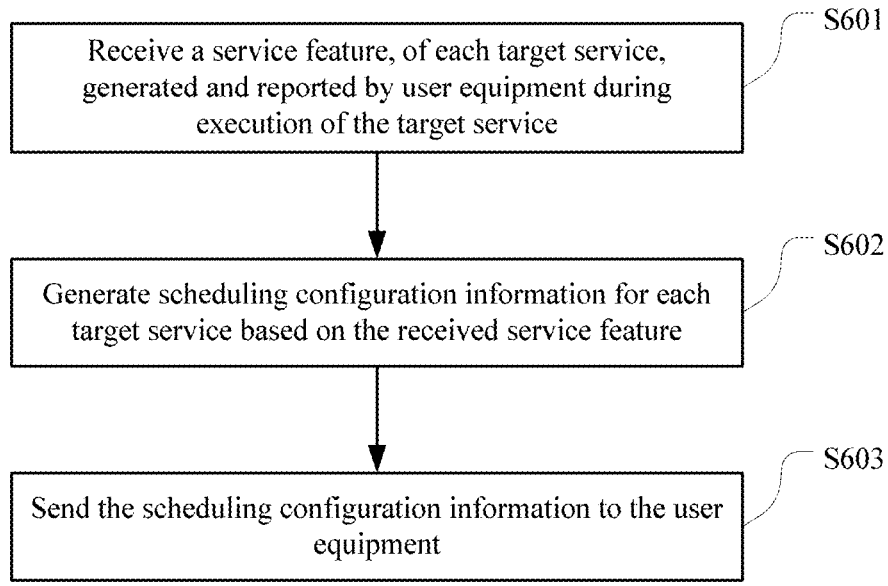
FIG. 6 is a schematic flowchart of a fourth embodiment of a scheduling resource configuration method on a base station side according to the disclosure.

Referring to FIG. 6, FIG. 6 is a schematic flowchart of a fourth embodiment of a scheduling resource configuration method on a base station side according to the disclosure. The method in this embodiment of the disclosure is performed on the base station side, and the method includes the following steps.

S601: Receive a service feature, of each target service, generated and reported by user equipment during execution of the target service.

The service feature generated and reported by the user equipment may be obtained by the user equipment through statistics collection after learning all (or a part) of generated data during execution of each current target service. Alternatively, the service feature may be obtained by the user equipment through statistics collection after learning all (or a part) of generated data during each previous execution of each current target service, and then may be preset in a memory. When currently executing a corresponding target service, the user equipment can directly report a service feature to a base station based on the preset service feature.

S602: Generate scheduling configuration information for each target service based on the received service feature, where the service feature includes data packet size feature information and/or data packet interval feature information, or the like.

The generated scheduling configuration information is SPS resource configuration information, including information such as SPS period information, data packet size information, SPS duration information, TTI length information of a physical-layer resource, coding format information, and carrier identifier information. In S602, scheduling configuration information may be generated for each target service.

S603: Send the scheduling configuration information to the user equipment, so that the user equipment correspondingly runs each target service and transmits data of a corresponding service based on the scheduling configuration information.

The base station transmits data of the target service based on the period information, the data packet size information, and transmission indication information that includes any one or more of a duration indication, a TTI length indication of a physical-layer resource, a coding format indication, and a carrier identifier indication. Specifically, the base station transmits the data of the target service of the user equipment based on an indication in the transmission indication information in the semi-persistent scheduling configuration information, when a period indicated by the period information in the semi-persistent scheduling configuration information arrives, and by using a data packet size in the semi-persistent scheduling configuration information as a standard.

In this embodiment of the disclosure, the service feature of each current service of the user terminal is obtained from the user terminal, so as to accurately set or adjust SPS resource configuration of the user terminal. This implements dynamic configuration of a scheduling resource such as an SPS resource, effectively saves PDCCH resources used for a scheduling indication in a system, and can also ensure, to fullest extent, data transmission quality of some services whose data packet sizes, periods, or the like change.

Figure 7:
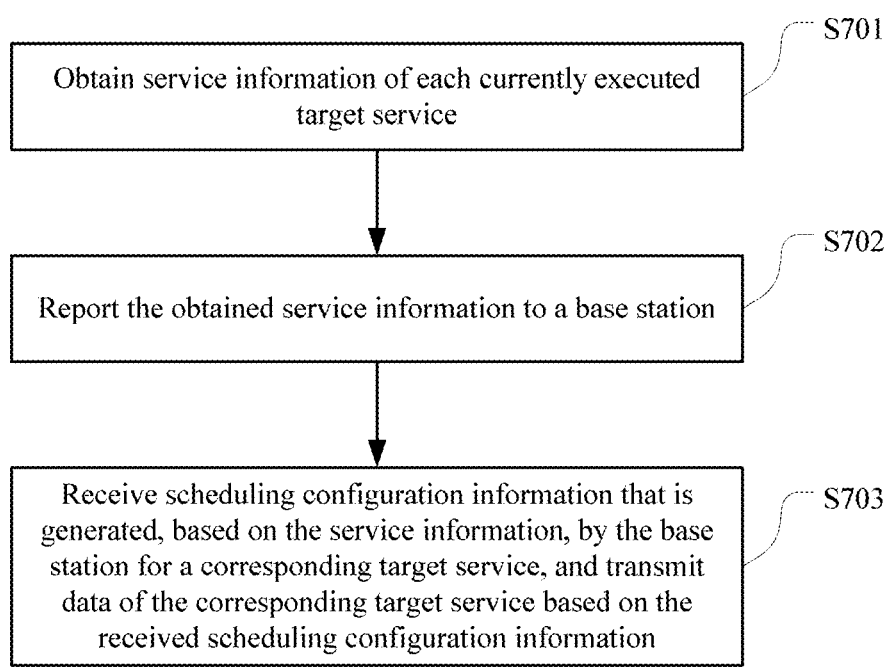
FIG. 7 is a schematic flowchart of an embodiment of a scheduling resource configuration method on a user equipment side according to the disclosure.

Referring to FIG. 7, FIG. 7 is a schematic flowchart of an embodiment of a scheduling resource configuration method on a user equipment side according to the disclosure. The method in this embodiment of the disclosure is performed by user equipment, and the method includes the following steps.

S701: Obtain service information of each currently executed target service, where the service information includes a bearer type and/or a QoS class identifier QCI of the target service, or the service information includes a historical data format of a transmitted data packet of the target service.

S702: Report the obtained service information to a base station.

The user equipment sends, to the base station by using a current communications link, the obtained service information including one or more of the foregoing pieces of information. The base station generates, based on the reported service information, scheduling configuration information of an SPS configuration information type or another type, and sends the scheduling configuration information to the user equipment.

S703: Receive the scheduling configuration information that is generated, based on the service information, by the base station for a corresponding target service, and transmit data of the corresponding target service based on the received scheduling configuration information.

The user terminal performs configuration based on the scheduling configuration information, to transmit the data of the corresponding target service based on an indication in the scheduling configuration information. Specifically, for example, the data is transmitted based on a data packet size, a period, a carrier ID, or the like in the scheduling configuration information.

In this embodiment of the disclosure, the user equipment may trigger, based on related information of the service, the base station to perform dynamic configuration of a scheduling resource such as an SPS resource. This effectively saves PDCCH resources used for a scheduling indication in a system, and can also ensure, to fullest extent, data transmission quality of some services whose data packet sizes, periods, or the like change.

Figure 8:
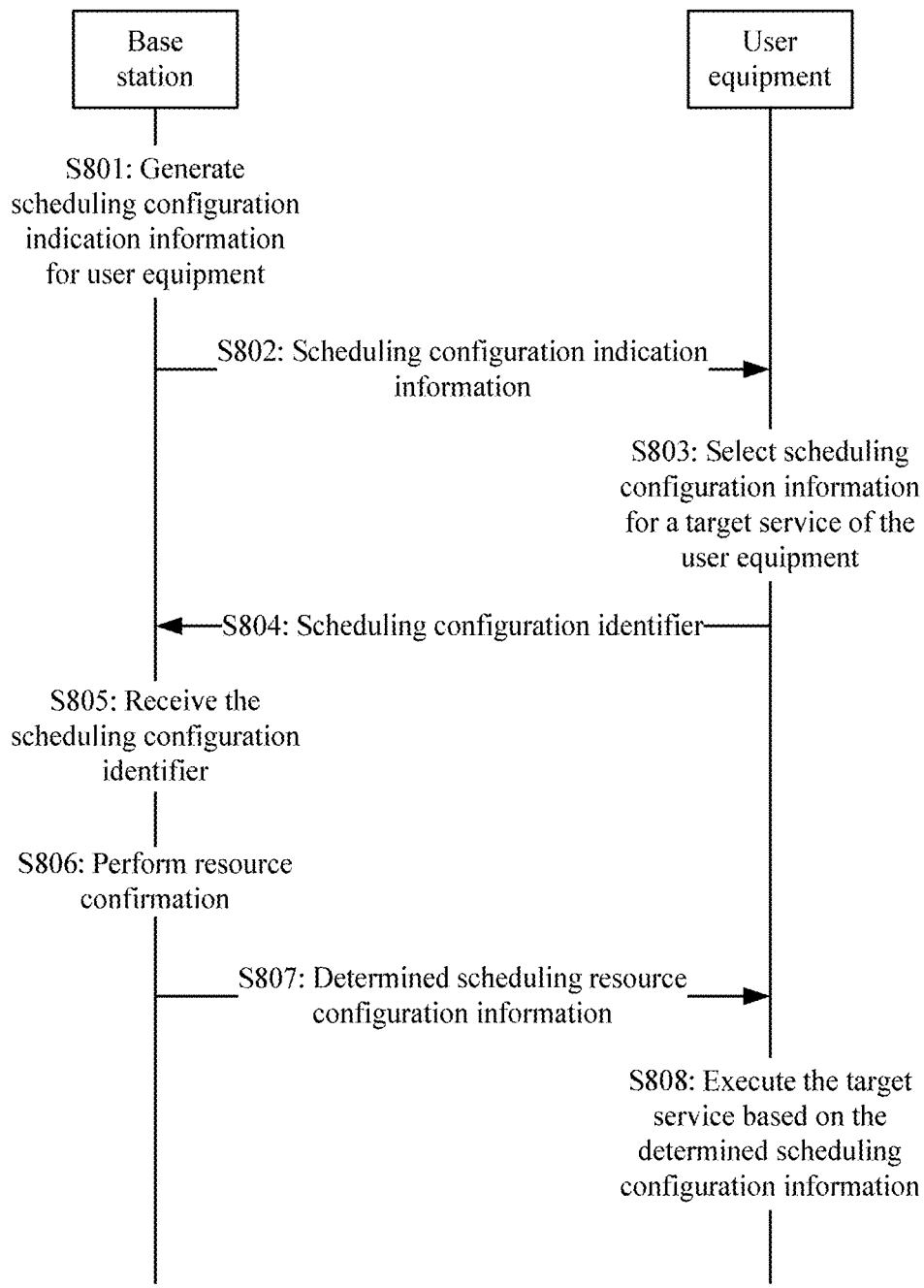
FIG. 8 is a schematic flowchart of another scheduling resource configuration method according to an embodiment of the disclosure.

Referring to FIG. 8, FIG. 8 is a schematic flowchart of another scheduling resource configuration method according to an embodiment of the disclosure. The method in this embodiment of the disclosure is performed by the user equipment UE1 and the base station 2 that are shown in FIG. 1. Specifically, a base station side completes scheduling-resource configuration for the user equipment UE1 based on related information of a target service executed by the UE1. The configuration may specifically include SPS resource configuration for the user equipment UE1. The method in this embodiment of the disclosure includes the following steps.

S801: The base station generates scheduling configuration indication information for the user equipment, where the scheduling configuration indication information includes a plurality of pieces of scheduling configuration information, and the scheduling configuration indication information is used to instruct the user equipment to select, from the scheduling configuration information included in the scheduling configuration indication information, scheduling configuration information for a target service currently executed by the user equipment.

The base station may generate one piece of scheduling configuration indication information simply based on a type of the target service of the user equipment. Alternatively, the base station may obtain scheduling configuration information based on the scheduling configuration information generation manner described in the embodiments corresponding to FIG. 2 to FIG. 7, and further generate one piece of scheduling configuration indication information.

In this embodiment of the disclosure, the scheduling configuration indication information may include a plurality of mapping relationships between threshold intervals and scheduling configuration information. For a specific mapping relationship, refer to Table 1. Table 1 shows a mapping relationship between a data packet size threshold, a packet interval threshold, and scheduling configuration information.

TABLE 1

|  | Scheduling resource | | | |
| --- | --- | --- | --- | --- |
|  | Scheduling resource 1 | Scheduling resource 2 | Scheduling resource 3 | Scheduling resource 4 |
| Packet size threshold | 1 byte to 10 bytes | 11 bytes to 20 bytes | 21 bytes to 50 bytes | 51 bytes to 100 bytes |
| Packet interval threshold | 1 ms to 10 ms | 11 ms to 20 ms | 21 ms to 30 ms | 31 ms to 40 ms |

It can be understood that content of Table 1 is merely an example. In another implementation, other parameters and data related to the parameters may be configured depending on a requirement. Each of the scheduling resource 1, the scheduling resource 2, the scheduling resource 3, and the scheduling resource 4 in Table 1 is corresponding to a set of SPS resource configuration information. Each set of SPS resource configuration information may include information such as SPS period information, data packet size information, SPS duration information, TTI length information of a physical-layer resource, coding format information, and carrier identifier information. The specific scheduling configuration information may be sent, as a part of the scheduling configuration indication information, to the user equipment. The scheduling configuration indication information is specifically used to instruct the user equipment to select scheduling information based on an interval of a service feature value and report the scheduling information to the base station after selection. The user equipment specifically selects, based on a threshold interval to which a service feature value of the target service belongs, the scheduling configuration information for the target service of the user equipment from the plurality of pieces of scheduling configuration information included in the scheduling configuration indication information. The service feature value includes a data packet size value and/or a data packet interval value, or the like.

The scheduling configuration indication information may include only a plurality of scheduling resource indexes. An index table includes a plurality of scheduling configuration information identifiers, and resource values that are in a one-to-one correspondence to the scheduling configuration information identifiers. For details, refer to the index table shown in Table 2.

TABLE 2

|  | Index | | | |
| --- | --- | --- | --- | --- |
|  | 1 | 2 | 3 | 4 |
| Packet size | 10 bytes | 20 bytes | 50 bytes | 100 bytes |
| Packet interval | 10 ms | 20 ms | 30 ms | 40 ms |

The index table in Table 2 is merely an example, and includes only resource values of a packet size and a packet interval. The index table may further include another parameter. The scheduling configuration indication information is specifically used to instruct the user equipment to select, based on the service feature value of the target service and the index table, the scheduling configuration information for the target service of the user equipment from the plurality of pieces of scheduling configuration information included in the scheduling configuration indication information. The service feature value includes a data packet size value and/or a data packet interval value. Each index is corresponding to a set of specific SPS resource configuration information. The specific scheduling configuration information may be sent, as a part of the scheduling configuration indication information, to the user equipment.

S802: The base station sends the scheduling configuration indication information to the user equipment. The base station sends the scheduling configuration indication information to the user equipment by using a communications link established between the base station and the user equipment.

S803: The user equipment selects, from the scheduling configuration information included in the scheduling configuration indication information, the scheduling configuration information for the target service of the user equipment.

The user terminal may determine a service feature (a data packet size or a packet interval) of the target service executed by the user terminal, and further select, from information including the scheduling configuration indication information in Table 1 and Table 2, proper scheduling configuration information to perform configuration, so as to transmit a data packet of the target service based on the selected scheduling configuration information.

S803 may specifically include: detecting a service feature value of a data packet transmitted during execution of the target service, where the service feature value includes a data packet size value and/or a data packet interval value; and selecting, based on a threshold interval to which the service feature value of the target service belongs, the scheduling configuration information for the target service of the user equipment from the plurality of pieces of scheduling configuration information included in the scheduling configuration indication information.

Alternatively, S803 may specifically include: detecting a service feature of the target service, where the service feature includes a data packet size value and/or a data packet interval value; and selecting, based on a service feature value of the target service and an index table included in the scheduling configuration indication information, the scheduling configuration information for the target service of the user equipment from the plurality of pieces of scheduling configuration information included in the scheduling configuration indication information, where the index table includes a plurality of scheduling configuration information identifiers, and resource values that are in a one-to-one correspondence to the scheduling configuration information identifiers.

S804: The user equipment sends, to the base station, a scheduling configuration identifier that is used to mark the selected scheduling configuration information. Optionally, the scheduling configuration information may be carried in a confirmation message, to be sent to the base station.

The scheduling configuration identifier may be an index identifier corresponding to the scheduling configuration information selected by the user terminal, for example, an identifier such as the index 1 in Table 2, or the scheduling resource 1 in Table 1.

It should be noted that, after performing S803, in another embodiment, the user equipment may directly return, to the base station, a confirmation message about scheduling resource configuration. After selecting the scheduling configuration information, the user equipment returns the confirmation message to the base station, to confirm the scheduling configuration information selected by the user equipment, so that the base station can allocate a corresponding resource based on an indication in the scheduling configuration information confirmed by using the confirmation message. The user equipment may alternatively execute the target service based on the selected scheduling configuration information. In other words, S804 and steps subsequent to S804 do not need to be performed.

In this embodiment of the disclosure, resource detection and determining need to be performed based on the scheduling configuration information selected by the user equipment, to determine whether a current network resource can satisfy a requirement of a scheduling resource selected by the user equipment. Then, the user equipment executes the target service based on finally determined scheduling configuration information. Based on resource detection and determining, the base station may finally instruct the user equipment to execute the target service based on the scheduling configuration information selected by the user equipment, or may modify the scheduling configuration information selected by the user equipment and instruct the user equipment to execute the target service based on modified scheduling configuration information.

S805: The base station receives the scheduling configuration identifier sent by the user equipment.

S806: The base station performs resource confirmation based on the scheduling configuration information indicated by the received scheduling configuration identifier.

S807: The base station notifies, based on a resource confirmation result, the user equipment of determined scheduling configuration information.

Resource confirmation performed by the base station includes: confirming whether the scheduling configuration information selected by the user equipment satisfies a data transmission requirement of the target service, and/or detecting whether a current resource of the base station satisfies a resource requirement of the scheduling configuration information. Based on the confirmation result, the base station may instruct the user equipment to use the scheduling configuration information selected by the user equipment, or may modify the scheduling configuration information and send modified scheduling configuration information to the user equipment.

S808: The user equipment executes the target service based on the determined scheduling configuration information. Based on the determined scheduling configuration information returned by the base station, the user equipment correspondingly executes the target service based on the determined scheduling configuration information or based on the modified scheduling configuration information.

Figure 9:
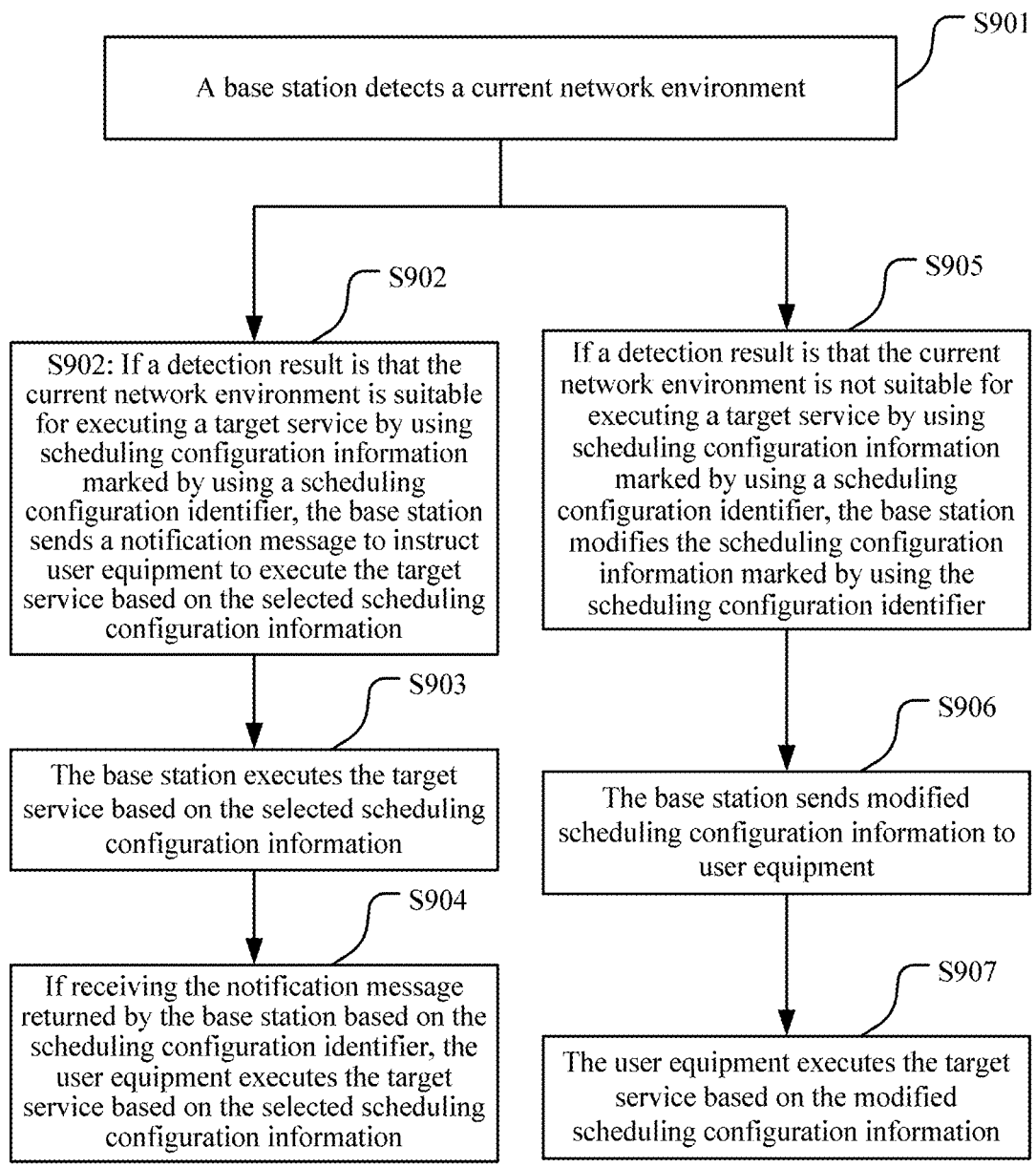
FIG. 9 is a schematic flowchart of a resource confirmation method according to an embodiment of the disclosure.

Specifically, FIG. 9 is a schematic flowchart of a resource confirmation method according to an embodiment of the disclosure. Specifically, the method includes the following steps.

S901: The base station detects a current network environment. Network environment detection is mainly determining whether the base station can currently satisfy a radio resource requirement of the scheduling configuration information selected by the user equipment.

S902: If a detection result is that the current network environment is suitable for executing the target service by using the scheduling configuration information marked by using the scheduling configuration identifier, the base station sends a notification message to instruct the user equipment to execute the target service based on the selected scheduling configuration information.

S903: The base station executes the target service based on the selected scheduling configuration information. The base station may return a notification message for confirmation to the user equipment. S902 and S903 may be simultaneously performed or may be performed in no particular order.

S904: If receiving the notification message returned by the base station based on the scheduling configuration identifier, the user equipment executes the target service based on the selected scheduling configuration information.

S905: If a detection result is that the current network environment is not suitable for executing the target service by using the scheduling configuration information marked by using the scheduling configuration identifier, the base station modifies the scheduling configuration information marked by using the scheduling configuration identifier, and executes the target service based on modified scheduling configuration information.

S906: The base station sends the modified scheduling configuration information to the user equipment.

S907: The user equipment executes the target service based on the modified scheduling configuration information.

In this embodiment of the disclosure, scheduling resource configuration selection may be performed based on a specific requirement of a service of the user equipment. This effectively saves PDCCH resources used for a scheduling indication in a system, can also ensure, to fullest extent, data transmission quality of some services whose data packet sizes, periods, or the like change, and improves flexibility of SPS resource scheduling.

Figure 10:
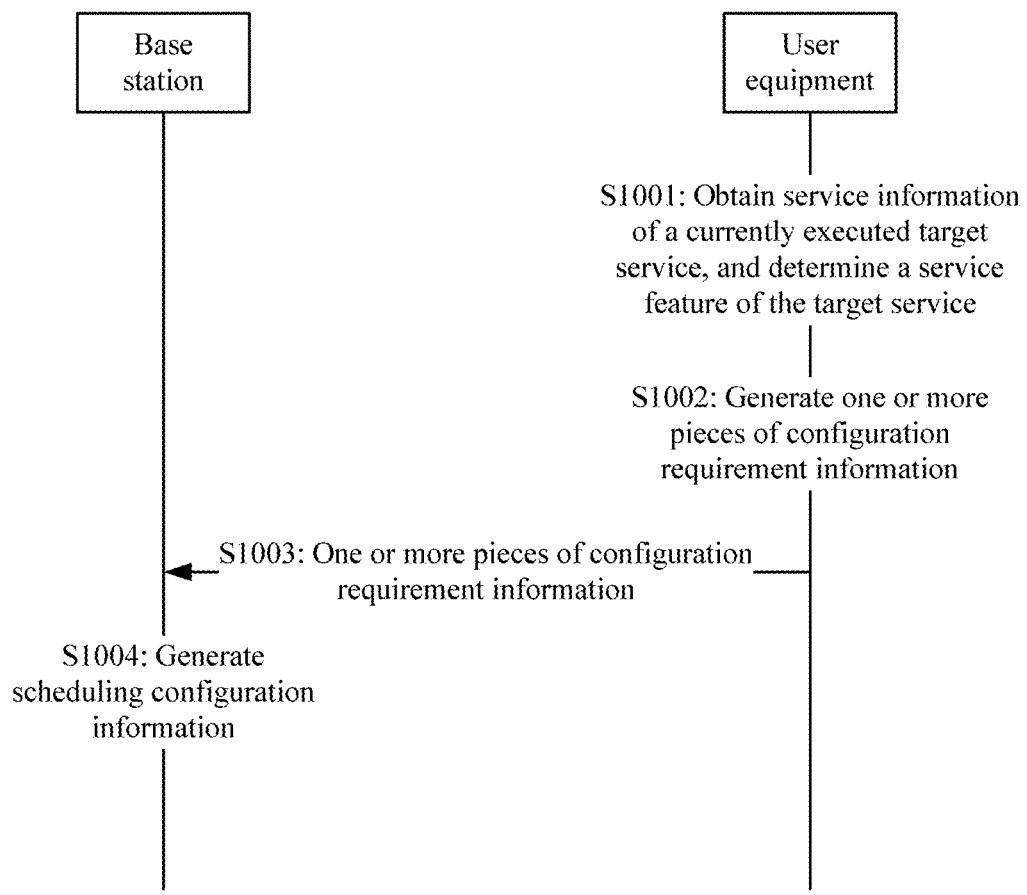
FIG. 10 is a schematic flowchart of still another scheduling resource configuration method according to an embodiment of the disclosure.

Referring to FIG. 10, FIG. 10 is a schematic flowchart of still another scheduling resource configuration method according to an embodiment of the disclosure. The method in this embodiment of the disclosure is performed by user equipment, and the method includes the following steps.

S1001: The user equipment obtains service information of a currently executed target service, and determines a service feature of the target service.

The service information includes a bearer type and/or a QoS class identifier QCI of the target service, or includes a data format of historically transmitted data of the target service.

The service information may be requested by the user equipment from a core network, or may be obtained by the user equipment through statistical learning. For specific descriptions of the service information, refer to related descriptions in the foregoing embodiments.

S1002: The user equipment generates one or more pieces of configuration requirement information based on the determined service feature.

The configuration requirement information may be information in terms of an SPS resource requirement, and each piece of configuration requirement information may specifically include any one or more of an SPS period requirement, a data packet size requirement, an SPS duration requirement, a TTI length requirement of a physical-layer resource, and a coding format requirement.

S1003: The user equipment sends the one or more pieces of generated configuration requirement information to a base station.

The one or more pieces of generated configuration requirement information may be sent to the base station by using a communications link established by the user equipment.

S1004: The base station generates, based on the one or more pieces of configuration requirement information, scheduling configuration information for the target service of the user equipment.

If receiving one piece of configuration requirement information sent by the user equipment, the base station may directly generate scheduling configuration information based on the configuration requirement information. For example, when an SPS period requirement (a data packet interval) and a data packet size that are in the configuration requirement information are 10 ms and 50 bytes, respectively, an SPS period and a data packet size that are in the generated scheduling configuration information are 10 ms and 50 bytes, respectively. When or after generating the scheduling configuration information, the base station allocates a related resource, to process service data of the target service of the user equipment.

When there is only one piece of configuration requirement information, the base station may alternatively determine, based on a current network environment, whether a resource of the base station can satisfy a resource requirement of the configuration requirement information. If the resource of the base station satisfies the resource requirement, the base station generates corresponding scheduling configuration information directly based on the configuration requirement information, notifies the user equipment of the generated scheduling configuration information, and performs resource scheduling. If the resource of the base station cannot satisfy the resource requirement, the base station adjusts content in the configuration requirement information, for example, adjusts a period or a data packet size, generates scheduling configuration information based on an adjusted requirement, and sends the scheduling configuration information to the user equipment.

If receiving a plurality of pieces of configuration requirement information of the user equipment, the base station may select, based on a current network environment of the base station, one piece of configuration requirement information from the plurality of pieces of configuration requirement information, generate scheduling configuration information based on the selected configuration requirement information, notify the user equipment of the generated scheduling configuration information, and perform configuration and scheduling of a corresponding resource.

When there are a plurality of pieces of configuration requirement information, when the base station selects configuration requirement information based on a current network environment status, it is possible that none of the configuration requirement information satisfies the network environment status. In this case, the base station may generate a piece of new scheduling configuration information with reference to a plurality of pieces of configuration requirement information, and notify the user equipment of the generated scheduling configuration information.

In this embodiment of the disclosure, scheduling resource configuration selection may be performed based on a specific requirement of a service of the user equipment. This effectively saves PDCCH resources used for a scheduling indication in a system, can also ensure, to fullest extent, data transmission quality of some services whose data packet sizes, periods, or the like change, and improves flexibility of SPS resource scheduling.

The following describes in detail a scheduling resource configuration apparatus, a base station processor, and user equipment according to embodiments of the disclosure.

Figure 11:
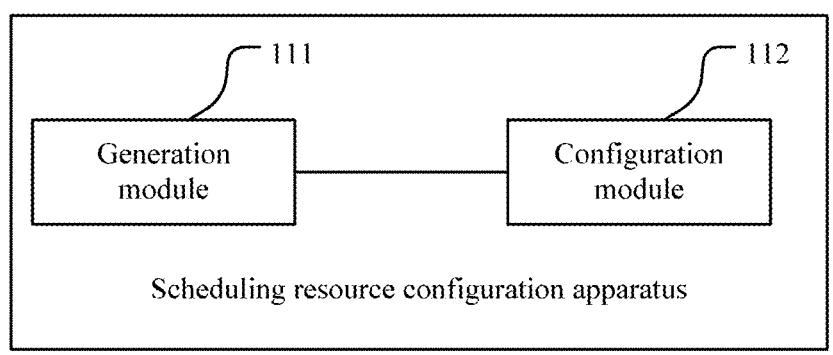
FIG. 11 is a schematic structural diagram of a first embodiment of a scheduling resource configuration apparatus according to the disclosure.

Referring to FIG. 11, FIG. 11 is a schematic structural diagram of a first embodiment of a scheduling resource configuration apparatus according to the disclosure. The scheduling resource configuration apparatus in this embodiment of the disclosure may be disposed in a scheduling module of a base station. Specifically, the scheduling resource configuration apparatus may include the following modules:

a generation module 111, configured to generate, based on a service feature of each target service currently executed by user equipment, scheduling configuration information for each target service of the user equipment, where a manner of obtaining the service feature of each target service executed by the user equipment includes: determining the service feature based on service information, reported by the user equipment, of each target service; or determining the service feature based on service information, obtained from a core network, of each target service of the user equipment; and a configuration module 112, configured to send the scheduling configuration information to the user equipment, so that the user equipment transmits data of a corresponding target service based on the scheduling configuration information.

The service feature is determined based on the service information of the target service, where the service information includes a bearer type and/or a QoS class identifier QCI of one or more target services, or the service information includes a historical data format of a transmitted data packet of one or more target services; and the service feature includes data packet size feature information and/or data packet interval feature information.

For specific implementation of each module in this embodiment of the disclosure, refer to descriptions of a related step in the foregoing method embodiment.

In this embodiment of the disclosure, the scheduling configuration information for the user equipment can be configured or reconfigured based on a specific data packet feature of the target service executed by the user equipment or a data format of historically transmitted data generated during execution of the target service. This implements dynamic configuration of a scheduling resource such as an SPS resource, effectively saves PDCCH resources used for a scheduling indication in a system, and can also ensure, to fullest extent, data transmission quality of some services whose data packet sizes, periods, or the like change.

Figure 12:
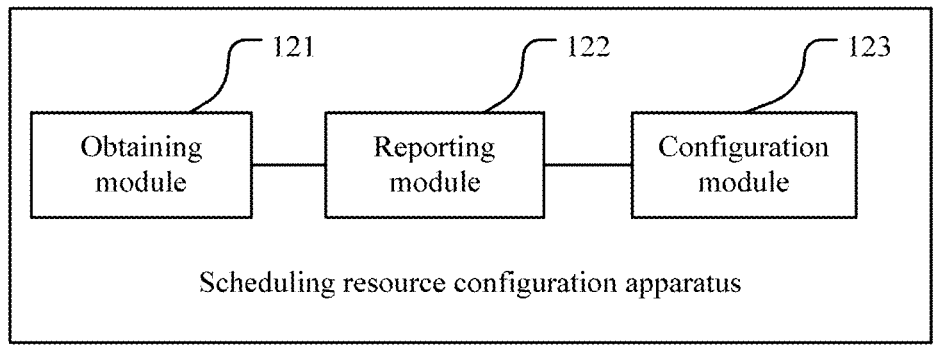
FIG. 12 is a schematic structural diagram of a second embodiment of a scheduling resource configuration apparatus according to the disclosure.

Referring to FIG. 12, FIG. 12 is a schematic structural diagram of a second embodiment of a scheduling resource configuration apparatus according to the disclosure. The apparatus in this embodiment of the disclosure may be disposed in user equipment such as a smartphone. Specifically, the apparatus in this embodiment of the disclosure includes the following modules:

an obtaining module 121, configured to obtain service information of each currently executed target service, where the service information includes a bearer type and/or a QoS class identifier QCI of the target service, or the service information includes a historical data format of a transmitted data packet of the target service;

a reporting module 122, configured to report the obtained service information to a base station; and a configuration module 123, configured to receive scheduling configuration information that is generated, based on the service information, by the base station for a corresponding target service, and transmit data of the corresponding target service based on the received scheduling configuration information.

For specific implementation of each module in this embodiment of the disclosure, refer to descriptions of a related step in the foregoing method embodiment.

In this embodiment of the disclosure, the scheduling configuration information for the user equipment can be configured or reconfigured based on a specific data packet feature of the target service executed by the user equipment or a data format of historically transmitted data generated during execution of the target service. This implements dynamic configuration of a scheduling resource such as an SPS resource, effectively saves PDCCH resources used for a scheduling indication in a system, and can also ensure, to fullest extent, data transmission quality of some services whose data packet sizes, periods, or the like change.

Figure 13:
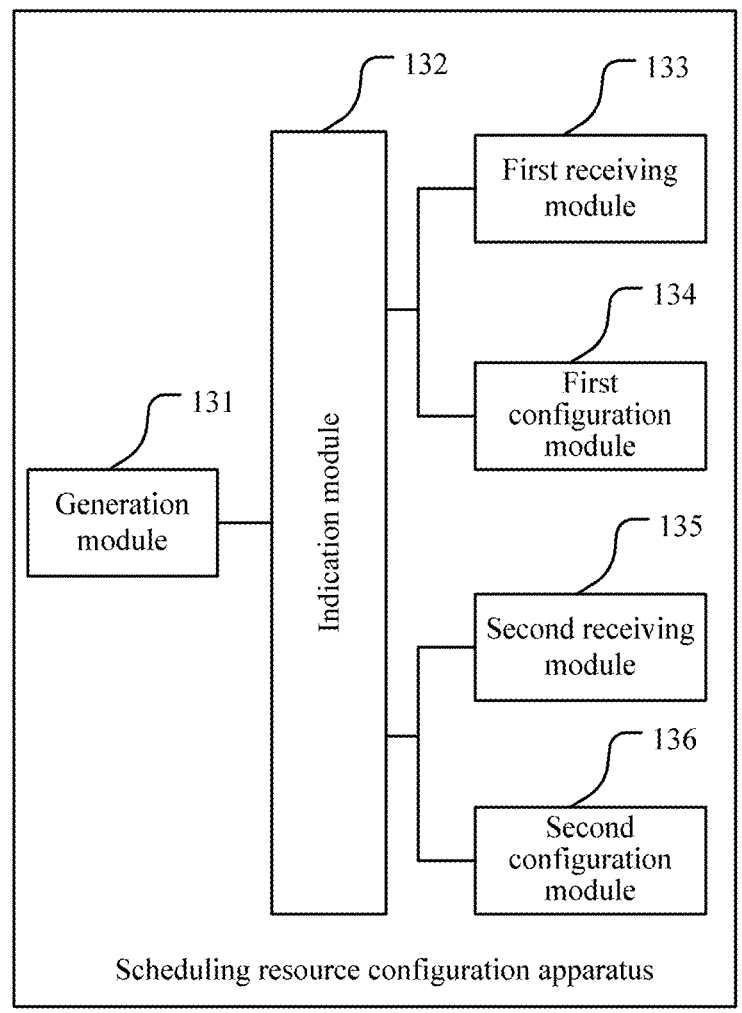
FIG. 13 is a schematic structural diagram of a third embodiment of a scheduling resource configuration apparatus according to the disclosure.

Referring to FIG. 13, FIG. 13 is a schematic structural diagram of a third embodiment of a scheduling resource configuration apparatus according to the disclosure. The apparatus in this embodiment of the disclosure may be disposed in a service device of a base station. Specifically, the apparatus in this embodiment of the disclosure includes the following modules:

a generation module 131, configured to generate scheduling configuration indication information for user equipment, where the scheduling configuration indication information includes scheduling configuration information, and the scheduling configuration indication information is used to instruct the user equipment to select, from the scheduling configuration information included in the scheduling configuration indication information, scheduling configuration information for a target service of the user equipment; and an indication module 132, configured to send the scheduling configuration indication information to the user equipment, so that the user equipment selects the scheduling configuration information to transmit data of the target service.

Optionally, the scheduling configuration indication information includes a plurality of pieces of scheduling configuration information, and a threshold interval is preset for each piece of scheduling configuration information.

The scheduling configuration indication information is specifically used to instruct the user equipment to select, based on a threshold interval to which a data packet feature value of the target service belongs, the scheduling configuration information for the target service of the user equipment from the plurality of pieces of scheduling configuration information included in the scheduling configuration indication information, and the data packet feature value of the target service includes a data packet size value and/or a data packet interval value.

Optionally, the scheduling configuration indication information includes an index table, and the index table includes a plurality of scheduling configuration information identifiers, and resource values that are in a one-to-one correspondence to the scheduling configuration information identifiers.

The scheduling configuration indication information is specifically used to instruct the user equipment to select, based on a data packet feature value of the target service and the index table, the scheduling configuration information for the target service of the user equipment from a plurality of pieces of scheduling configuration information included in the scheduling configuration indication information, and the data packet feature value of the target service includes a data packet size value and/or a data packet interval value.

Optionally, the apparatus in this embodiment of the disclosure may further include:

a first receiving module 133, configured to receive a scheduling configuration identifier sent by the user equipment, where the scheduling configuration identifier is used to mark the scheduling configuration information that is selected by the user equipment based on an instruction of the scheduling configuration indication information; and a first configuration module 134, configured to: detect a current network environment; and if a detection result is that the current network environment is suitable for executing the target service by using the scheduling configuration information marked by using the scheduling configuration identifier, send a notification message to instruct the user equipment to execute the target service based on the selected scheduling configuration information.

Optionally, the apparatus in this embodiment of the disclosure may further include:

a second receiving module 135, configured to receive a scheduling configuration identifier sent by the user equipment, where the scheduling configuration identifier is used to mark the scheduling configuration information that is selected by the user equipment based on an instruction of the scheduling configuration indication information; and a second configuration module 136, configured to: detect a current network environment; if a detection result is that the current network environment is not suitable for executing the target service by using the scheduling configuration information marked by using the scheduling configuration identifier, modify the scheduling configuration information marked by using the scheduling configuration identifier; and send modified scheduling configuration information to the user equipment, so that the user equipment executes the target service based on the modified scheduling configuration information.

For specific implementation of each module in this embodiment of the disclosure, refer to specific descriptions of a related step in the foregoing method embodiment.

In this embodiment of the disclosure, scheduling resource configuration selection may be performed. This effectively saves PDCCH resources used for a scheduling indication in a system, can also ensure, to fullest extent, data transmission quality of some services whose data packet sizes, periods, or the like change, and improves flexibility of SPS resource scheduling.

Figure 14:
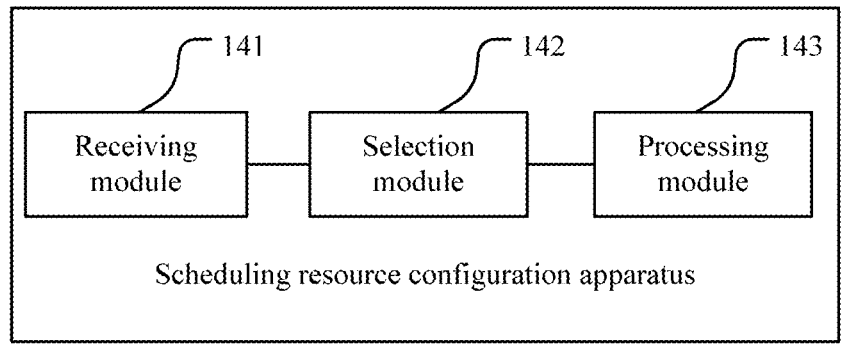
FIG. 14 is a schematic structural diagram of a fourth embodiment of a scheduling resource configuration apparatus according to the disclosure.

Referring to FIG. 14, FIG. 14 is a schematic structural diagram of a fourth embodiment of a scheduling resource configuration apparatus according to the disclosure. The apparatus in this embodiment of the disclosure may be disposed in user equipment such as a smartphone. Specifically, the apparatus in this embodiment of the disclosure includes the following modules:

a receiving module 141, configured to receive scheduling configuration indication information sent by a base station;

a selection module 142, configured to select, from scheduling configuration information included in the scheduling configuration indication information, scheduling configuration information for a target service of the user equipment; and a processing module 143, configured to transmit data of the target service based on the selected scheduling configuration information.

Optionally, the selection module 142 is specifically configured to: detect a data packet feature value of a data packet transmitted during execution of the target service, where the data packet feature value includes a data packet size value and/or a data packet interval value; and select, based on a threshold interval to which the data packet feature value of the target service belongs, the scheduling configuration information for the target service of the user equipment from a plurality of pieces of scheduling configuration information included in the scheduling configuration indication information.

Optionally, the selection module 142 is specifically configured to: detect a data packet feature value of a data packet transmitted during execution of the target service, where the data packet feature value includes a data packet size value and/or a data packet interval value; and select, based on the data packet feature value of the target service and an index table included in the scheduling configuration indication information, the scheduling configuration information for the target service of the user equipment from a plurality of pieces of scheduling configuration information included in the scheduling configuration indication information, where the index table includes a plurality of scheduling configuration information identifiers, and resource values that are in a one-to-one correspondence to the scheduling configuration information identifiers.

Optionally, the processing module 143 is specifically configured to: send, to the base station, a scheduling configuration identifier that is used to mark the selected scheduling configuration information; and if a confirmation message returned by the base station is received, execute the target service based on the selected scheduling configuration information.

Optionally, the processing module 143 is specifically configured to: send, to the base station, a scheduling configuration identifier that is used to mark the selected scheduling configuration information; and if modified scheduling configuration information returned by the base station is received, execute the target service based on the modified scheduling configuration information.

For specific implementation of each module in this embodiment of the disclosure, refer to descriptions of a related step in the foregoing method embodiment.

In this embodiment of the disclosure, scheduling resource configuration selection may be performed based on a specific requirement of a service of the user equipment. This effectively saves PDCCH resources used for a scheduling indication in a system, can also ensure, to fullest extent, data transmission quality of some services whose data packet sizes, periods, or the like change, and improves flexibility of SPS resource scheduling.

Figure 15:
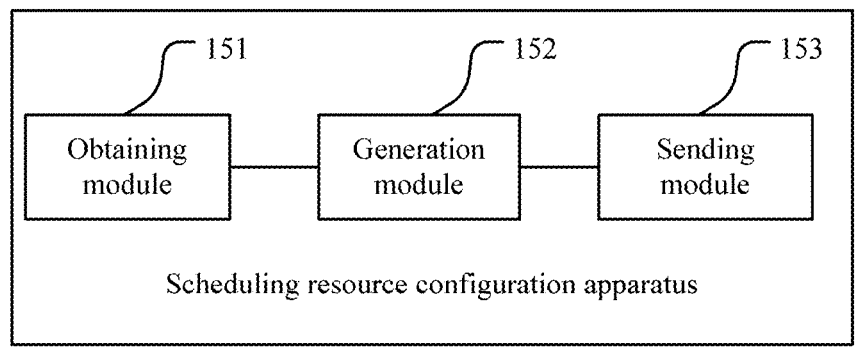
FIG. 15 is a schematic structural diagram of a fifth embodiment of a scheduling resource configuration apparatus according to the disclosure.

Referring to FIG. 15, FIG. 15 is a schematic structural diagram of a fifth embodiment of a scheduling resource configuration apparatus according to the disclosure. The apparatus in this embodiment of the disclosure may be disposed in user equipment such as a smartphone. Specifically, the apparatus in this embodiment of the disclosure includes the following modules:

an obtaining module 151, configured to obtain service information of a currently executed target service, and determine a service feature of the target service, where the service information includes a bearer type and/or a QoS class identifier QCI of the target service or includes a data format of historically transmitted data of the target service;

a generation module 152, configured to generate one or more pieces of configuration requirement information based on the determined service feature; and a sending module 153, configured to send the one or more pieces of generated configuration requirement information to a base station, so that the base station generates, based on the one or more pieces of configuration requirement information, scheduling configuration information for the target service of the user equipment.

For specific implementation of each module in this embodiment of the disclosure, refer to descriptions of a related step in the foregoing method embodiment.

In this embodiment of the disclosure, scheduling resource configuration selection may be performed based on a specific requirement of a service of the user equipment. This effectively saves resources, such as PDCCH resources, used for a scheduling indication in a system, can also ensure, to fullest extent, data transmission quality of some services whose data packet sizes, periods, or the like change, and improves flexibility of SPS resource scheduling.

Figure 16:
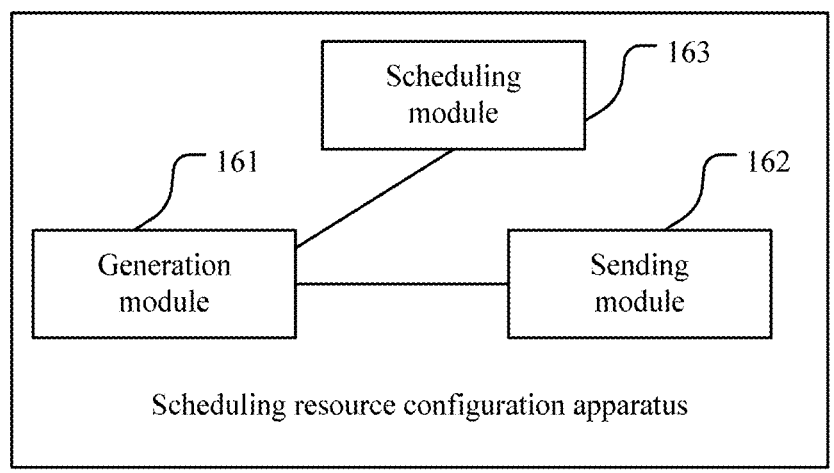
FIG. 16 is a schematic structural diagram of a sixth embodiment of a scheduling resource configuration apparatus according to the disclosure.

FIG. 16 is a schematic structural diagram of a sixth embodiment of a scheduling resource configuration apparatus according to the disclosure. The apparatus in this embodiment of the disclosure includes a generation module 161, a sending module 162, and a scheduling module 163.

The generation module 161 is configured to generate semi-persistent scheduling configuration information for a target service.

The sending module 162 is configured to send the generated scheduling configuration information to user equipment, so that the user equipment transmits data of the corresponding service.

The scheduling module 163 is configured to transmit data of the target service based on an indication in transmission indication information in the semi-persistent scheduling configuration information, where the transmission indication information includes any one or more of a duration indication, a TTI length indication of a physical-layer resource, a coding format indication, and a carrier identifier indication.

For specific implementation of the generation module and the sending module in this embodiment of the disclosure, refer to specific descriptions of related steps in the foregoing method embodiment. According to this embodiment of the disclosure, period information, data packet size information, duration information, TTI length information of a physical-layer resource, coding format information, and carrier identifier information can be flexibly configured for the user equipment. This better satisfies different SPS requirements of target services of the user equipment.

The following further describes a base station and user equipment in embodiments of the disclosure.

Figure 17:
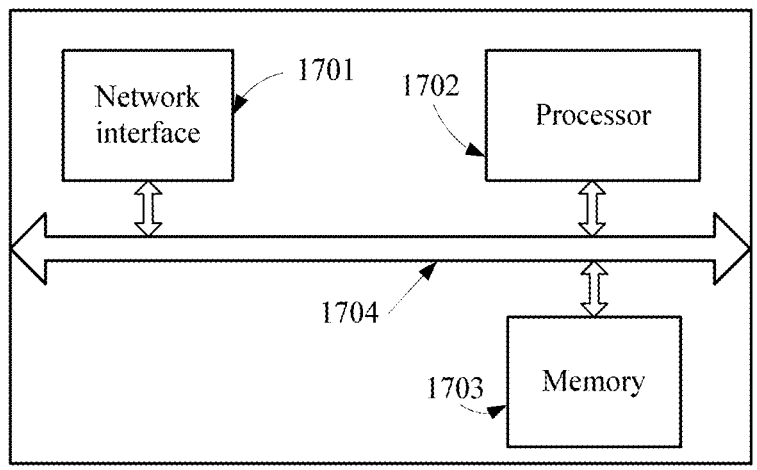
FIG. 17 is a schematic structural diagram of a first embodiment of a base station according to the disclosure.

Referring to FIG. 17, FIG. 17 is a schematic structural diagram of a first embodiment of a base station according to the disclosure. The base station in this embodiment of the disclosure may specifically include a housing, a power supply, and another structure. In this embodiment of the disclosure, the base station further includes a network interface 1701 and a processor 1702 connected to the network interface 1701. The base station further includes a memory 1703 and a bus 1704 that is configured to transmit and distribute data. The memory 1703 stores a related application program. The processor 1702 invokes a corresponding application program stored in the memory 1703, to perform the following functions described in this embodiment of the disclosure. Modules that are in the base station and that require data transmission may connect data to each other by using the bus 1704.

The network interface 1701 is configured to communicate with user equipment and a network device.

The processor 1702 is configured to: generate, based on a service feature of each target service currently executed by the user equipment, scheduling configuration information for each target service of the user equipment; and send the scheduling configuration information to the user equipment by using the network interface 1701, so that the user equipment transmits data of a corresponding target service based on the scheduling configuration information, where a manner of obtaining the service feature of each target service executed by the user equipment includes: determining the service feature based on service information, reported by the user equipment, of each target service; or determining the service feature based on service information, obtained from a core network, of each target service of the user equipment.

The service feature is determined based on the service information of the target service. The service information includes a bearer type and/or a QoS class identifier QCI of one or more target services, or the service information includes a historical data format of a transmitted data packet of one or more target services. The service feature includes data packet size feature information and/or data packet interval feature information.

For specific implementation of a related structure such as the processor 1702 in this embodiment of the disclosure, refer to descriptions of a related step in the foregoing method embodiment.

In this embodiment of the disclosure, the scheduling configuration information for the user equipment can be configured or reconfigured based on a specific data packet feature of the target service executed by the user equipment or a data format of historically transmitted data generated during execution of the target service. This implements dynamic configuration of a scheduling resource such as an SPS resource, effectively saves resources, such as PDCCH resources, used for a scheduling indication in a system, and can also ensure, to fullest extent, data transmission quality of some services whose data packet sizes, periods, or the like change.

Figure 18:
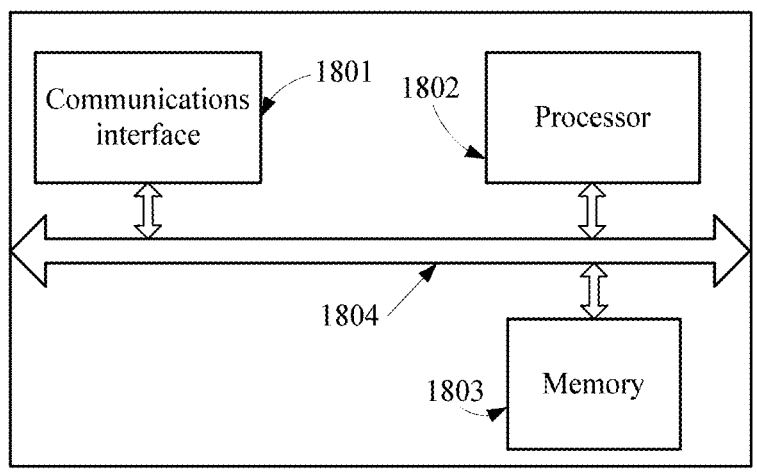
FIG. 18 is a schematic structural diagram of a first embodiment of user equipment according to the disclosure.

Referring to FIG. 18, FIG. 18 is a schematic structural diagram of a first embodiment of user equipment according to the disclosure. The user equipment in this embodiment of the disclosure may be a smartphone, specifically including a display screen, a power supply, various buttons, and another structure. In this embodiment of the disclosure, the user equipment includes a communications interface 1801 and a processor 1802 connected to the communications interface 1801. The user equipment further includes a memory 1803 and a bus 1804 that is configured to transmit and distribute data. The memory 1803 stores a related application program. The processor 1802 invokes a corresponding application program stored in the memory 1803, to perform the following functions described in this embodiment of the disclosure. Modules that are in the user equipment and that require data transmission may connect data to each other by using the bus 1804.

The communications interface 1801 is configured to communicate with a base station.

The processor 1802 is configured to: obtain service information of each currently executed target service, where the service information includes a bearer type and/or a QoS class identifier QCI of the target service, or the service information includes a historical data format of a transmitted data packet of the target service; report the obtained service information to the base station by using the communications interface 1801; receive, by using the communications interface 1801, scheduling configuration information that is generated, based on the service information, by the base station for a corresponding target service; and transmit data of the corresponding target service based on the received scheduling configuration information.

For specific implementation of all structures, including the processor 1802, in this embodiment of the disclosure, refer to descriptions of related steps in the foregoing method embodiment.

In this embodiment of the disclosure, the scheduling configuration information for the user equipment can be configured or reconfigured based on a specific data packet feature of the target service executed by the user equipment or a data format of historically transmitted data generated during execution of the target service. This implements dynamic configuration of a scheduling resource such as an SPS resource, effectively saves PDCCH resources used for a scheduling indication in a system, and can also ensure, to fullest extent, data transmission quality of some services whose data packet sizes, periods, or the like change.

Figure 19:
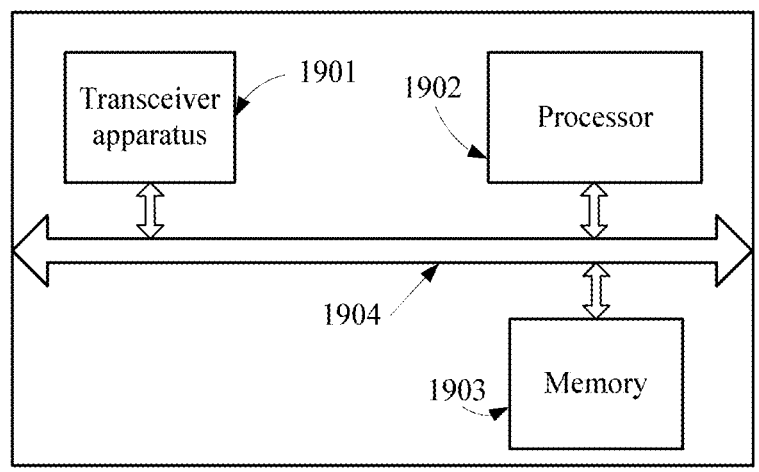
FIG. 19 is a schematic structural diagram of a second embodiment of a base station according to the disclosure.

Referring to FIG. 19, FIG. 19 is a schematic structural diagram of a second embodiment of a base station according to the disclosure. The base station in this embodiment of the disclosure may specifically include a housing, a power supply, and another structure. In this embodiment of the disclosure, the base station further includes a transceiver apparatus 1901 and a processor 1902 connected to the transceiver apparatus 1901. The base station further includes a memory 1903 and a bus 1904 that is configured to transmit and distribute data. The memory 1903 stores a related application program. The processor 1902 invokes a corresponding application program stored in the memory 1903, to perform the following functions described in this embodiment of the disclosure. Modules that are in the base station and that require data transmission may connect data to each other by using the bus 1904.

The transceiver apparatus 1901 is configured to communicate with user equipment and a network device.

The processor 1902 is configured to: generate scheduling configuration indication information for the user equipment, where the scheduling configuration indication information includes scheduling configuration information, and the scheduling configuration indication information is used to instruct the user equipment to select, from the scheduling configuration information included in the scheduling configuration indication information, scheduling configuration information for a target service of the user equipment; and send the scheduling configuration indication information to the user equipment by using the transceiver apparatus 1901, so that the user equipment selects the scheduling configuration information to transmit data of the target service.

Optionally, the scheduling configuration indication information includes a plurality of pieces of scheduling configuration information, and a threshold interval is preset for each piece of scheduling configuration information.

The scheduling configuration indication information is specifically used to instruct the user equipment to select, based on a threshold interval to which a data packet feature value of the target service belongs, the scheduling configuration information for the target service of the user equipment from the plurality of pieces of scheduling configuration information included in the scheduling configuration indication information, and the data packet feature value of the target service includes a data packet size value and/or a data packet interval value.

Optionally, the scheduling configuration indication information includes an index table, and the index table includes a plurality of scheduling configuration information identifiers, and resource values that are in a one-to-one correspondence to the scheduling configuration information identifiers.

The scheduling configuration indication information is specifically used to instruct the user equipment to select, based on a data packet feature value of the target service and the index table, the scheduling configuration information for the target service of the user equipment from a plurality of pieces of scheduling configuration information included in the scheduling configuration indication information, and the data packet feature value of the target service includes a data packet size value and/or a data packet interval value.

Optionally, the processor 1902 is further configured to: receive, by using the transceiver apparatus 1901, a scheduling configuration identifier sent by the user equipment, where the scheduling configuration identifier is used to mark the scheduling configuration information that is selected by the user equipment based on an instruction of the scheduling configuration indication information; detect a current network environment; and if a detection result is that the current network environment is suitable for executing the target service by using the scheduling configuration information marked by using the scheduling configuration identifier, send a notification message by using the transceiver apparatus 1901, to instruct the user equipment to execute the target service based on the selected scheduling configuration information.

Optionally, the processor 1902 is further configured to: receive, by using the transceiver apparatus 1901, a scheduling configuration identifier sent by the user equipment, where the scheduling configuration identifier is used to mark the scheduling configuration information that is selected by the user equipment based on an instruction of the scheduling configuration indication information; detect a current network environment; if a detection result is that the current network environment is not suitable for executing the target service by using the scheduling configuration information marked by using the scheduling configuration identifier, modify the scheduling configuration information marked by using the scheduling configuration identifier; and send modified scheduling configuration information to the user equipment by using the transceiver apparatus 1901, so that the user equipment executes the target service based on the modified scheduling configuration information.

For specific implementation of an included structure such as the processor 1902 in this embodiment of the disclosure, refer to specific descriptions of a related step in the foregoing method embodiment.

In this embodiment of the disclosure, scheduling resource configuration selection may be performed. This effectively saves PDCCH resources used for a scheduling indication in a system, can also ensure, to fullest extent, data transmission quality of some services whose data packet sizes, periods, or the like change, and improves flexibility of SPS resource scheduling.

Figure 20:
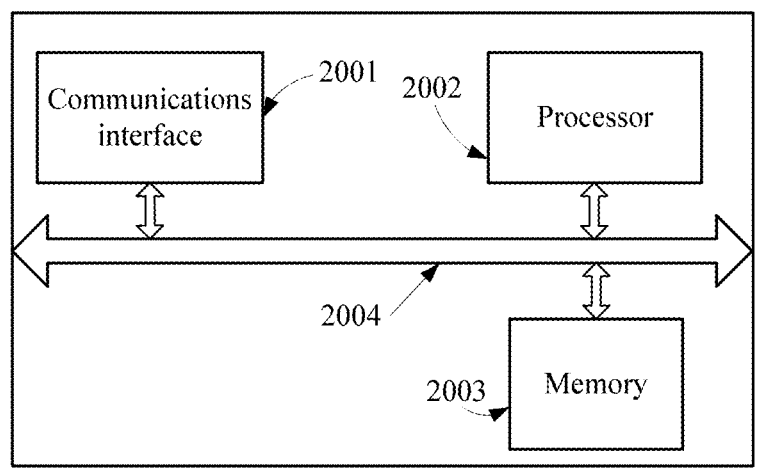
FIG. 20 is a schematic structural diagram of a second embodiment of user equipment according to the disclosure.

Referring to FIG. 20, FIG. 20 is a schematic structural diagram of a second embodiment of user equipment according to the disclosure. The user equipment in this embodiment of the disclosure may be a smartphone, specifically including a display screen, a power supply, various buttons, and another structure. In this embodiment of the disclosure, the user equipment includes a communications interface 2001 and a processor 2002 connected to the communications interface 2001. The user equipment further includes a memory 2003 and a bus 2004 that is configured to transmit and distribute data. The memory 2003 stores a related application program. The processor 2002 invokes a corresponding application program stored in the memory 2003, to perform the following functions described in this embodiment of the disclosure. Modules that are in the user equipment and that require data transmission may connect data to each other by using the bus 2004.

The communications interface 2001 is configured to communicate with a base station.

The processor 2002 is configured to: receive, by using the communications interface 2001, scheduling configuration indication information sent by the base station; select, from scheduling configuration information included in the scheduling configuration indication information, scheduling configuration information for a target service of the user equipment; and transmit data of the target service based on the selected scheduling configuration information.

Optionally, the processor 2002 is specifically configured to: detect a data packet feature value of a data packet transmitted during execution of the target service, where the data packet feature value includes a data packet size value and/or a data packet interval value; and select, based on a threshold interval to which the data packet feature value of the target service belongs, the scheduling configuration information for the target service of the user equipment from a plurality of pieces of scheduling configuration information included in the scheduling configuration indication information.

Optionally, the processor 2002 is specifically configured to: detect a data packet feature value of a data packet transmitted during execution of the target service, where the data packet feature value includes a data packet size value and/or a data packet interval value; and select, based on the data packet feature value of the target service and an index table included in the scheduling configuration indication information, the scheduling configuration information for the target service of the user equipment from a plurality of pieces of scheduling configuration information included in the scheduling configuration indication information, where the index table includes a plurality of scheduling configuration information identifiers, and resource values that are in a one-to-one correspondence to the scheduling configuration information identifiers.

Optionally, the processor 2002 is further configured to: send, to the base station by using the communications interface 2001, a scheduling configuration identifier that is used to mark the selected scheduling configuration information; and if a confirmation message returned by the base station is received, execute the target service based on the selected scheduling configuration information.

Optionally, the processor 2002 is further configured to: send, to the base station by using the communications interface 2001, a scheduling configuration identifier that is used to mark the selected scheduling configuration information; and if modified scheduling configuration information returned by the base station is received, execute the target service based on the modified scheduling configuration information.

For specific implementation of a structure such as the processor 2002 in this embodiment of the disclosure, refer to descriptions of a related step in the foregoing method embodiment.

In this embodiment of the disclosure, scheduling resource configuration selection may be performed based on a specific requirement of a service of the user equipment. This effectively saves PDCCH resources used for a scheduling indication in a system, can also ensure, to fullest extent, data transmission quality of some services whose data packet sizes, periods, or the like change, and improves flexibility of SPS resource scheduling.

Figure 21:
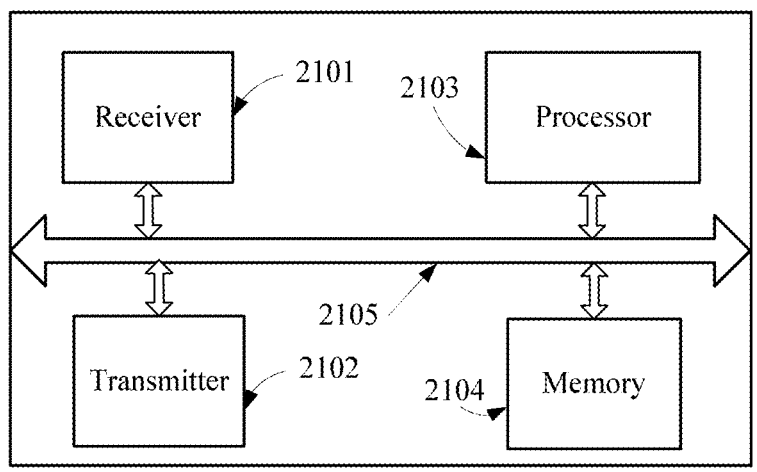
FIG. 21 is a schematic structural diagram of a third embodiment of user equipment according to the disclosure.

Referring to FIG. 21, FIG. 21 is a schematic structural diagram of a third embodiment of user equipment according to the disclosure. The user equipment in this embodiment of the disclosure may be a smartphone, specifically including a display screen, a power supply, various buttons, and another structure. In this embodiment of the disclosure, the user equipment includes a receiver 2101, a transmitter 2102, and a processor 2103 connected to the receiver 2101 and the transmitter 2102. The user equipment further includes a memory 2104 and a bus 2105 that is configured to transmit and distribute data. The memory 2104 stores a related application program. The processor 2103 invokes a corresponding application program stored in the memory 2104, to perform the following functions described in this embodiment of the disclosure. Modules that are in the user equipment and that require data transmission may connect data to each other by using the bus 2105.

The receiver 2101 and the transmitter 2102 are configured to communicate with a base station.

The processor 2103 is configured to: obtain service information of a currently executed target service, and determine a service feature of the target service, where the service information includes a bearer type and/or a QoS class identifier QCI of the target service or includes a data format of historically transmitted data of the target service; generate one or more pieces of configuration requirement information based on the determined service feature; and send the one or more pieces of generated configuration requirement information to the base station by using the transmitter 2102, so that the base station generates, based on the one or more pieces of configuration requirement information, scheduling configuration information for a target service of the user equipment.

For specific implementation of a structure such as the processor 2103 in this embodiment of the disclosure, refer to descriptions of a related step in the foregoing method embodiment.

In this embodiment of the disclosure, scheduling resource configuration selection may be performed based on a specific requirement of a service of the user equipment. This effectively saves resources, such as PDCCH resources, used for a scheduling indication in a system, can also ensure, to fullest extent, data transmission quality of some services whose data packet sizes, periods, or the like change, and improves flexibility of SPS resource scheduling.

Figure 22:
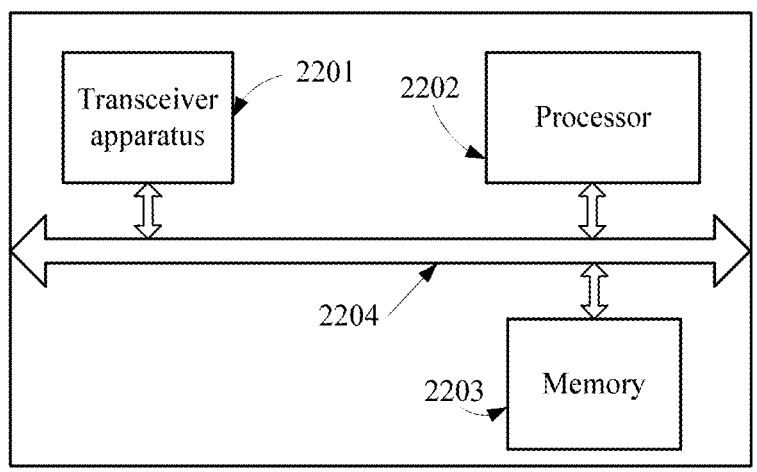
FIG. 22 is a schematic structural diagram of a third embodiment of a base station according to the disclosure.

Referring to FIG. 22, FIG. 22 is a schematic structural diagram of a third embodiment of a base station according to the disclosure. User equipment in this embodiment of the disclosure may be a smartphone, specifically including a display screen, a power supply, various buttons, and another structure. In this embodiment of the disclosure, the base station includes a transceiver apparatus 2201 and a processor 2202 connected to the transceiver apparatus 2201. The base station further includes a memory 2203 and a bus 2204 that is configured to transmit and distribute data. The memory 2203 stores a related application program. The processor 2202 invokes a corresponding application program stored in the memory 2203, to perform the following functions described in this embodiment of the disclosure. Modules that are in the base station and that require data transmission may connect data to each other by using the bus 2204.

The transceiver apparatus 2201 is configured to communicate with the user equipment and a network device.

The processor 2202 is configured to: generate semi-persistent scheduling configuration information for a target service; transmit data of the target service of the user equipment based on an indication in transmission indication information in the semi-persistent scheduling configuration information; and send the generated semi-persistent scheduling configuration information to the user equipment by using the transceiver apparatus, so that the user equipment transmits data of the target service based on an indication in the semi-persistent scheduling configuration information, where the transmission indication information includes any one or more of a duration indication, a TTI length indication of a physical-layer resource, a coding format indication, and a carrier identifier indication.

For specific implementation of a structure such as the processor 2202 in this embodiment of the disclosure, refer to descriptions of a related step in the foregoing method embodiment.

In this embodiment of the disclosure, scheduling resource configuration selection may be performed based on a specific requirement of a service of the user equipment. This effectively saves resources, such as PDCCH resources, used for a scheduling indication in a system, can also ensure, to fullest extent, data transmission quality of some services whose data packet sizes, periods, or the like change, and improves flexibility of SPS resource scheduling.

Based on the foregoing descriptions of the implementations, a person skilled in the art may clearly understand that each implementation may be implemented by software in addition to a necessary general hardware platform, or certainly, may be implemented by hardware. Based on such an understanding, the foregoing technical solutions essentially or the part contributing to the prior art may be represented in a form of a software product. The computer software product may be stored in a computer readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

The foregoing implementations do not constitute any limitation on the protection scope of the technical solutions. Any modification, equivalent replacement, and improvement made without departing from the spirit and principle of the foregoing implementations shall fall within the protection scope of the technical solutions.

What is claimed is:

1. A scheduling resource configuration method, comprising:
   generating scheduling configuration indication information for user equipment, wherein the scheduling configuration indication information comprises a plurality of pieces of scheduling configuration information, each piece of scheduling configuration information comprising corresponding semi-persistent scheduling (SPS) resource configuration information, wherein an interval range of a corresponding data packet feature value is preset for each piece of scheduling configuration information, and the scheduling configuration indication information is used to instruct the user equipment to select, from the plurality of pieces of scheduling configuration information comprised in the scheduling configuration indication information, scheduling configuration information for a target service of the user equipment; and sending the scheduling configuration indication information to the user equipment, so that the user equipment selects the scheduling configuration information for the target service based on a data packet feature value of the target service to transmit data of the target service, wherein the data packet feature value of the target service comprises a data packet size value and/or a data packet interval value.

2. The method according to claim 1, wherein the scheduling configuration indication information is used to instruct the user equipment to select, based on an interval range to which the data packet feature value of the target service belongs, the scheduling configuration information for the target service of the user equipment from the plurality of pieces of scheduling configuration information comprised in the scheduling configuration indication information.

3. The method according to claim 1, wherein the scheduling configuration indication information comprises an index table, and the index table comprises a plurality of scheduling configuration information identifiers, and resource values that are in a one-to-one correspondence to the scheduling configuration information identifiers; and wherein the selection by the user equipment of the scheduling configuration information for the target service of the user equipment from the plurality of pieces of scheduling configuration information comprised in the scheduling configuration indication information is further based on the index table.

4. The method according to claim 1, further comprising:

receiving a scheduling configuration identifier sent by the user equipment, wherein the scheduling configuration identifier is used to mark the scheduling configuration information that is selected by the user equipment based on an instruction of the scheduling configuration indication information; and detecting a current network environment, and if a detection result is that the current network environment is suitable for executing the target service by using the scheduling configuration information marked by using the scheduling configuration identifier, sending a notification message to instruct the user equipment to execute the target service based on the selected scheduling configuration information.

5. The method according to claim 1, further comprising:

receiving a scheduling configuration identifier sent by the user equipment, wherein the scheduling configuration identifier is used to mark the scheduling configuration information that is selected by the user equipment based on an instruction of the scheduling configuration indication information;

detecting a current network environment, and if a detection result is that the current network environment is not suitable for executing the target service by using the scheduling configuration information marked by using the scheduling configuration identifier, modifying the scheduling configuration information marked by using the scheduling configuration identifier; and sending modified scheduling configuration information to the user equipment, so that the user equipment executes the target service based on the modified scheduling configuration information.

6. A scheduling resource configuration method, comprising:

receiving scheduling configuration indication information sent by a base station;

detecting a data packet feature value of a data packet transmitted during execution of a target service of user equipment, wherein the data packet feature value comprises a data packet size value and/or a data packet interval value;

selecting, from a plurality of pieces of scheduling configuration information comprised in the scheduling configuration indication information, scheduling configuration information for the target service of the user equipment based on the data packet feature value of the target service, wherein each piece of scheduling configuration information comprises corresponding semi-persistent scheduling (SPS) resource configuration information, wherein an interval range of a corresponding data packet feature value is preset for each piece of scheduling configuration information; and transmitting data of the target service based on the selected scheduling configuration information if confirmed by the base station.

7. The method according to claim 6, wherein the selecting, from the plurality of pieces of scheduling configuration information comprised in the scheduling configuration indication information, scheduling configuration information for target service of user equipment comprises:

selecting, based on an interval range to which the data packet feature value of the target service belongs, the scheduling configuration information for the target service of the user equipment from the plurality of pieces of scheduling configuration information comprised in the scheduling configuration indication information.

8. The method according to claim 6, wherein the selecting, from the plurality of pieces of scheduling configuration information comprised in the scheduling configuration indication information, scheduling configuration information for the target service of the user equipment further comprises:

selecting, based on the data packet feature value of the target service and an index table comprised in the scheduling configuration indication information, the scheduling configuration information for the target service of the user equipment from the plurality of pieces of scheduling configuration information comprised in the scheduling configuration indication information, wherein the index table comprises a plurality of scheduling configuration information identifiers, and resource values that are in a one-to-one correspondence to the scheduling configuration information identifiers.

9. The method according to claim 6, further comprising:

sending, to the base station, a scheduling configuration identifier that is used to mark the selected scheduling configuration information; and if a confirmation message returned by the base station is received, executing the target service based on the selected scheduling configuration information.

10. The method according to claim 6, further comprising:

sending, to the base station, a scheduling configuration identifier that is used to mark the selected scheduling configuration information; and if modified scheduling configuration information returned by the base station is received, executing the target service based on the modified scheduling configuration information.

11. A network device, comprising a transceiver apparatus and a processor connected to the transceiver apparatus, wherein the transceiver apparatus is configured to enable communication between user equipment and the network device; and the processor is configured to: generate scheduling configuration indication information for the user equipment, wherein the scheduling configuration indication information comprises a plurality of pieces of scheduling configuration information, each piece of scheduling configuration information comprising corresponding semi-persistent scheduling (SPS) resource configuration information, wherein an interval range of a corresponding data packet feature value is preset for each piece of scheduling configuration information, and the scheduling configuration indication information is used to instruct the user equipment to select, from the plurality of pieces of scheduling configuration information comprised in the scheduling configuration indication information, scheduling configuration information for a target service of the user equipment; and send the scheduling configuration indication information to the user equipment by using the transceiver apparatus, so that the user equipment selects the scheduling configuration information for the target service based on a data packet feature value of the target service to transmit data of the target service, wherein the data packet feature value of the target service comprises a data packet size value and/or a data packet interval value.

12. The network device according to claim 11, wherein the scheduling configuration indication information is used to instruct the user equipment to select, based on an interval range to which the data packet feature value of the target service belongs, the scheduling configuration information for the target service of the user equipment from the plurality of pieces of scheduling configuration information comprised in the scheduling configuration indication information.

13. The network device according to claim 11, wherein the scheduling configuration indication information comprises an index table, and the index table comprises a plurality of scheduling configuration information identifiers, and resource values that are in a one-to-one correspondence to the scheduling configuration information identifiers; and wherein the selection by the user equipment of the scheduling configuration information for the target service of the user equipment from the plurality of pieces of scheduling configuration information comprised in the scheduling configuration indication information is further based on the index table.

14. The network device according to claim 11, wherein the processor is further configured to: receive, by using the transceiver apparatus, a scheduling configuration identifier sent by the user equipment, wherein the scheduling configuration identifier is used to mark the scheduling configuration information that is selected by the user equipment based on an instruction of the scheduling configuration indication information; detect a current network environment; and if a detection result is that the current network environment is suitable for executing the target service by using the scheduling configuration information marked by using the scheduling configuration identifier, send a notification message by using the transceiver apparatus, to instruct the user equipment to execute the target service based on the selected scheduling configuration information.

15. The network device according to claim 11, wherein the processor is further configured to: receive, by using the transceiver apparatus, a scheduling configuration identifier sent by the user equipment, wherein the scheduling configuration identifier is used to mark the scheduling configuration information that is selected by the user equipment based on an instruction of the scheduling configuration indication information; detect a current network environment; if a detection result is that the current network environment is not suitable for executing the target service by using the scheduling configuration information marked by using the scheduling configuration identifier, modify the scheduling configuration information marked by using the scheduling configuration identifier; and send modified scheduling configuration information to the user equipment by using the transceiver apparatus, so that the user equipment executes the target service based on the modified scheduling configuration information.

16. A non-transitory computer-readable medium comprising code which, when executed by a processor, causes the processor to perform a scheduling resource configuration method, comprising:

generating scheduling configuration indication information for user equipment, wherein the scheduling configuration indication information comprises a plurality of pieces of scheduling configuration information, each piece of scheduling configuration information comprising corresponding semi-persistent scheduling (SPS) resource configuration information, wherein an interval range of a corresponding data packet feature value is preset for each piece of scheduling configuration information, and the scheduling configuration indication information is used to instruct the user equipment to select, from the plurality of pieces of scheduling configuration information comprised in the scheduling configuration indication information, scheduling configuration information for a target service of the user equipment; and sending the scheduling configuration indication information to the user equipment, so that the user equipment selects the scheduling configuration information for the target service based on a data packet feature value of the target service to transmit data of the target service, wherein the data packet feature value of the target service comprises a data packet size value and/or a data packet interval value.

17. The non-transitory computer-readable medium according to claim 16, wherein the scheduling configuration indication information is used to instruct the user equipment to select, based on an interval range to which the data packet feature value of the target service belongs, the scheduling configuration information for the target service of the user equipment from the plurality of pieces of scheduling configuration information comprised in the scheduling configuration indication information.

18. The non-transitory computer-readable medium according to claim 16, wherein the scheduling configuration indication information comprises an index table, and the index table comprises a plurality of scheduling configuration information identifiers, and resource values that are in a one-to-one correspondence to the scheduling configuration information identifiers; and wherein the selection by the user equipment of the scheduling configuration information for the target service of the user equipment from the plurality of pieces of scheduling configuration information comprised in the scheduling configuration indication information is further based on the index table.

19. The non-transitory computer-readable medium according to claim 16, further comprising code for:

receiving a scheduling configuration identifier sent by the user equipment, wherein the scheduling configuration identifier is used to mark the scheduling configuration information that is selected by the user equipment based on an instruction of the scheduling configuration indication information; and detecting a current network environment, and if a detection result is that the current network environment is suitable for executing the target service by using the scheduling configuration information marked by using the scheduling configuration identifier, sending a notification message to instruct the user equipment to execute the target service based on the selected scheduling configuration information.

20. The non-transitory computer-readable medium according to claim 16, further comprising code for:

receiving a scheduling configuration identifier sent by the user equipment, wherein the scheduling configuration identifier is used to mark the scheduling configuration information that is selected by the user equipment based on an instruction of the scheduling configuration indication information;

detecting a current network environment, and if a detection result is that the current network environment is not suitable for executing the target service by using the scheduling configuration information marked by using the scheduling configuration identifier, modifying the scheduling configuration information marked by using the scheduling configuration identifier; and sending modified scheduling configuration information to the user equipment, so that the user equipment executes the target service based on the modified scheduling configuration information.

\* \* \* \* \*